United States Patent
Noh et al.

(10) Patent No.: US 11,827,741 B2
(45) Date of Patent: *Nov. 28, 2023

(54) EPOXY COMPOUND, COMPOSITION PREPARED THEREFROM, SEMICONDUCTOR DEVICE PREPARED THEREFROM, ELECTRONIC DEVICE PREPARED THEREFROM, ARTICLE PREPARED THEREFROM, AND METHOD OF PREPARING EPOXY COMPOUND

(71) Applicant: Samsung Electronics Co., Ltd., Suwon-si (KR)

(72) Inventors: Changho Noh, Suwon-si (KR); Insu Lee, Hwaseong-si (KR); Songwon Hyun, Yongin-si (KR); Yoonseok Ko, Suwon-si (KR); Mijeong Kim, Hwaseong-si (KR); Keechang Lee, Suwon-si (KR); Sangsoo Jee, Hwaseong-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/546,294

(22) Filed: Dec. 9, 2021

(65) Prior Publication Data

US 2022/0185947 A1    Jun. 16, 2022

(30) Foreign Application Priority Data

Dec. 15, 2020    (KR) .................. 10-2020-0175827

(51) Int. Cl.
*C08G 59/24*    (2006.01)
*C08K 3/013*    (2018.01)
(Continued)

(52) U.S. Cl.
CPC ......... *C08G 59/245* (2013.01); *C08G 59/621* (2013.01); *C08K 3/013* (2018.01);
(Continued)

(58) Field of Classification Search
CPC .................... C08G 59/245; C08G 59/621; C08G 2170/00; C08G 2190/00; C08K 3/013;
(Continued)

(56) References Cited

U.S. PATENT DOCUMENTS

| | | |
|---|---|---|
| 5,811,504 A | 9/1998 | Shiota et al. |
| 2005/0171301 A1 | 8/2005 | Doba |

(Continued)

FOREIGN PATENT DOCUMENTS

| | | | | |
|---|---|---|---|---|
| CN | 103408510 A | | 11/2013 | |
| CN | 109407384 A | * | 3/2019 | ............. C09K 19/52 |

(Continued)

OTHER PUBLICATIONS

Nobutoki et al., JP 2013-209631 A machine translation in English, Oct. 10, 2013 (Year: 2013).*

(Continued)

*Primary Examiner* — David T Karst
(74) *Attorney, Agent, or Firm* — CANTOR COLBURN LLP

(57) ABSTRACT

An epoxy compound having an aromatic ring represented by Formula 1 or Formula 2, a composition prepared from the epoxy compound, a semiconductor device prepared from the epoxy compound, an electronic device prepared from the epoxy compound, an article prepared from the epoxy compound, and a method of preparing the epoxy compound:

$$E1\text{-}(M1)_{a1}\text{-}(L1)_{b1}\text{-}(M2)_{a2}\text{-}L2\text{-}A1\text{-}L3\text{-}(M3)_{a3}\text{-}(L4)_{b2}\text{-}(M4)_{a4}\text{-}E2 \quad \text{Formula 1}$$

$$E3\text{-}(A2)_{c1}\text{-}(L5)_{b3}\text{-}(M5)_{a5}\text{-}L6\text{-}(M6)_{a6}\text{-}L7\text{-}(M7)_{a7}\text{-}(L8)_{b4}\text{-}(A3)_{c2}\text{-}E4 \quad \text{Formula 2}$$

(Continued)

In Formulae 1 and 2, M1, M2, M3, M4, M5, M6, M7, A1, A2, A3, L1, L2, L3, L4, L5, L6, L7, L8, E1, E2, E3, E4, a1, a2, a3, a4, a5, a6, a7, b1, b2, b3, b4, c1, and c2 are the same as defined in the detailed description.

16 Claims, 5 Drawing Sheets

(51) Int. Cl.
    *C08G 59/62*     (2006.01)
    *C08L 63/00*     (2006.01)

(52) U.S. Cl.
    CPC .......... *C08L 63/00* (2013.01); *C08G 2170/00* (2013.01); *C08G 2190/00* (2013.01); *C08K 2201/001* (2013.01); *C08L 2203/206* (2013.01)

(58) Field of Classification Search
    CPC ............... C08K 2201/001; C08L 63/00; C08L 2203/206
    USPC ........................................................ 528/100
    See application file for complete search history.

(56) References Cited

U.S. PATENT DOCUMENTS

| | | | |
|---|---|---|---|
| 2009/0323011 | A1 | 12/2009 | He et al. |
| 2011/0240918 | A1* | 10/2011 | Ootsuki .................. C09K 19/36 |
| | | | 528/297 |

FOREIGN PATENT DOCUMENTS

| | | | |
|---|---|---|---|
| EP | 3653660 | A1 | 5/2020 |
| GB | 1017612 | A | 1/1966 |
| GB | 2297549 | A | 8/1996 |
| JP | 1997118673 | A | 5/1997 |
| JP | 2003502484 | A | 1/2003 |
| JP | 2005162746 | A | 6/2005 |
| JP | 2012041507 | A | 3/2012 |
| JP | 2013209631 | A | 10/2013 |
| JP | 2014218600 | A | 11/2014 |
| KR | 1020110104918 | A | 9/2011 |

OTHER PUBLICATIONS

Shen et al., CN 109407384 A machine translation in English, Mar. 1, 2019. (Year: 2019).*
Ali Ramazani, et al., Synthesis of N-acylurea derivatives from carboxylic acids and N,N dialkyl carbodiimides in water, J. Chem. Sci., 127, 12, 2015, 2269.
Atsushi Shiota, et al., Synthesis and Curing of Novel LC Twin Epoxy Monomersfor Liquid Crystal Thermosets, Journal of Polymer Science: Part A: Polymer Chemistry, vol. 34, 1291-1303 (1996).
Christopher Farren, et al., Development of Epoxy Resins with Controlled High Order Structures Having Excellent Heat Release Properties, IEEJ Trans. Fundam. Mater., 2003, 123, pp. 687-692.
English Abstract of JP 2005-162746, Jun. 23, 2005.
English Abstract of JP 2012-041507, Mar. 1, 2012.
English Abstract of JP 2013-209631, Oct. 10, 2013.
English Abstract of JP 2014-218600, Nov. 20, 2014.
English Abstract of KR 10-2011-0104918, Sep. 23, 2011.
Miyuki Harada, et al., Thermal-Conductivity Properties of Liquid-Crystalline Epoxy Resin Curedunder a Magnetic Field, Polym. Sci. B, Polym. Phys., 2003, 41, pp. 1739-1743.
Ying Lin, et al., Epoxy Thermoset Resins with Pristine High Thermal Conductivity, High Volt., 2017, vol. 2 Iss. 3, pp. 139-146.
Extended European Search Report dated May 4, 2022 in corresponding EP Patent Application No. 21213964.6, 6 pp.
Lee, Jun Yeob et al., "Synthesis and Curing of Liquid Crystalline Epoxy Resin Based on Naphthalene Mesogen," Journal of polymer science: Part A: Polymer Chemistry, vol. 37, pp. 419-425 (1999).

* cited by examiner

EPOXY COMPOUND, COMPOSITION PREPARED THEREFROM, SEMICONDUCTOR DEVICE PREPARED THEREFROM, ELECTRONIC DEVICE PREPARED THEREFROM, ARTICLE PREPARED THEREFROM, AND METHOD OF PREPARING EPOXY COMPOUND

CROSS-REFERENCE TO RELATED APPLICATION

This application is based on and claims priority to Korean Patent Application No. 10-2020-0175827, filed on Dec. 15, 2020, in the Korean Intellectual Property Office, and all the benefits accruing therefrom under 35 U.S.C. § 119, the entire content of which is incorporated by reference herein.

BACKGROUND

1. Field

The present disclosure relates to an epoxy compound, a composition prepared from the epoxy compound, a semiconductor device prepared from the epoxy compound, an electronic device prepared from the epoxy compound, an article prepared from the epoxy compound, and a method of preparing the epoxy compound.

2. Description of the Related Art

Due to the trend of manufacturing semiconductor circuits having high complexity and high density, thermal stability of molding materials for releasing heat generated from semiconductor circuits has become important.

An epoxy molding compound (EMC) including a thermosetting resin is used as a molding material of a semiconductor package.

An inorganic filler with high thermal conductivity is added to increase thermal conductivity of the EMC.

However, in spite of the addition of the high-thermal-conductivity inorganic filler, the increase in thermal conductivity of the EMC is insignificant.

SUMMARY

Provided are epoxy compounds having improved heat releasing characteristics and processing characteristics which may be easily synthesized by having a novel structure.

Provided are epoxy resin compositions including the epoxy compounds.

Provided are semiconductor devices including cured products obtained from the compositions.

Provided are electronic devices including cured products obtained from the compositions.

Provided are articles including cured products obtained from the compositions.

Provided are methods of preparing the epoxy compounds.

Additional aspects will be set forth in part in the description which follows and, in part, will be apparent from the description, or may be learned by practice of the presented embodiments of the disclosure.

According to an aspect of an embodiment, an epoxy compound including an aromatic ring is represented by Formula 1 or Formula 2:

$$E1\text{-}(M1)_{a1}\text{-}(L1)_{b1}\text{-}(M2)_{a2}\text{-}L2\text{-}A1\text{-}L3\text{-}(M3)_{a3}\text{-}(L4)_{b2}\text{-}(M4)_{a4}\text{-}E2 \quad \text{Formula 1}$$

$$E3\text{-}(A2)_{c1}\text{-}(L5)_{b3}\text{-}(M5)_{a5}\text{-}L6\text{-}(M6)_{a6}\text{-}L7\text{-}(M7)_{a7}\text{-}(L8)_{b4}\text{-}(A3)_{c2}\text{-}E4 \quad \text{Formula 2}$$

In Formulae 1 and 2,

M1, M4, M5, and M7 are each independently an arylene group represented by Formulae 3a to 3j, M2, M3, and M6 are each independently a naphthalene group represented by Formulae 3g to 3j,

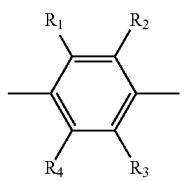

Formula 3a

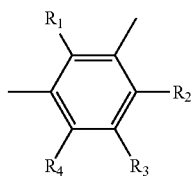

Formula 3b

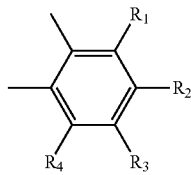

Formula 3c

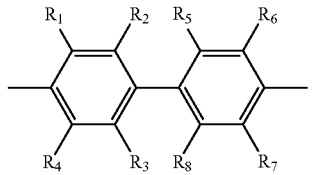

Formula 3d

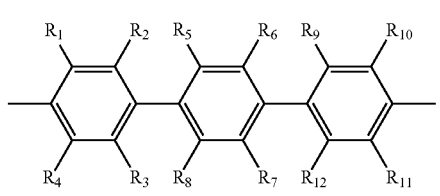

Formula 3e

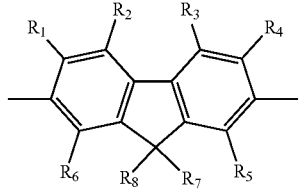

Formula 3f

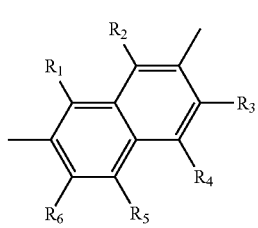

Formula 3g

-continued

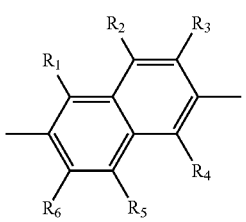

Formula 3h

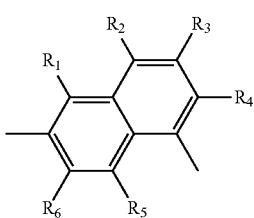

Formula 3i

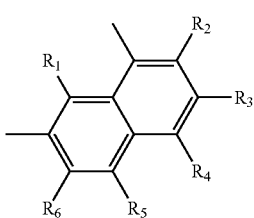

Formula 3j wherein, in Formulae 3a to 3j, $R_1$, $R_2$, $R_3$, $R_4$, $R_5$, $R_6$, $R_7$, $R_8$, $R_9$, $R_{10}$, $R_{11}$, and $R_{12}$ are each independently a hydrogen, a halogen, a hydroxy group, or a substituted or unsubstituted C1-C10 alkyl group;

A1, A2, and A3 are each independently a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L1, L2, L3, L4, L5, L6, L7, and L8 are each independently —C(=O)O— or —OC(=O)—,

E1, E2, E3, and E4 are each independently an epoxy-containing group, a1, a4, b1, b2, b3, b4, c1, and c2 are each independently 0 or 1, and a2, a3, a5, a6, and a7 are each independently 1 or 2.

According to an aspect of an embodiment, an epoxy resin composition includes;
the epoxy compound; and
a curing agent.

According to an aspect of an embodiment, a semiconductor device includes;
a substrate; a semiconductor; and
a cured product of an epoxy resin composition including a curing agent, and an epoxy compound represented by Formula 1, an epoxy compound represented by Formula 2, or a combination thereof,
a sealing portion including the cured product of the epoxy resin composition,
a substrate portion including the cured product of the epoxy resin composition,
a reinforcement portion including the cured product of the epoxy resin composition, or
an adhesive portion including the cured product of the epoxy resin composition.

According to an aspect of an embodiment, an electronic device includes
a substrate;
an electronic component; and
a cured product of an epoxy resin composition including a curing agent, and an epoxy compound represented by Formula 1, an epoxy compound represented by Formula 2, or a combination thereof,
a sealing portion including the cured product of the epoxy resin composition,
a substrate portion including the cured product of the epoxy resin composition,
a reinforcement portion including the cured product of the epoxy resin composition, or
an adhesive portion including the cured product of the epoxy resin composition.

According to an aspect of an embodiment, an article includes
a substrate; and
a cured product of an epoxy resin composition including a curing agent, and an epoxy compound represented by Formula 1, an epoxy compound by Formula 2, or a combination thereof,
a sealing portion including the cured product of the epoxy resin composition,
a substrate portion including the cured product of the epoxy resin composition,
a reinforcement portion including the cured product of the epoxy resin composition, or
an adhesive portion including the cured product of the epoxy resin composition.

According to an aspect of an embodiment, a method of preparing an epoxy compound includes
providing a first composition by contacting a compound represented by Formula 11 with a compound represented by Formula 12;
preparing a second composition including a compound represented by Formula 1 from the first composition; and
recovering the second composition,
wherein the recovering of the second composition is performed while the providing of the first composition is being performed.

$$E1\text{-}(M1)_{a1}\text{-}(L1)_{b1}\text{-}(M2)_{a2}\text{-}L2\text{-}A1\text{-}L3\text{-}(M3)_{a3}\text{-}(L4)_{b2}\text{-}(M4)_{a4}\text{-}E2 \quad \text{Formula 1}$$

$$R_c\text{-}(M1)_{a1}\text{-}(L1)_{b1}\text{-}(M2)_{a2}\text{-}L2\text{-}A1\text{-}L3\text{-}(M3)_{a3}\text{-}(L4)_{b2}\text{-}(M4)_{a4}\text{-}R_d \quad \text{Formula 11}$$

$$E\text{-}R_e \quad \text{Formula 12}$$

In Formulae 1, 11, and 12,

M1, M4, M5, and M7 are each independently an arylene group represented by Formulae 3a to 3j, M2, M3, and M6 are each independently a naphthalene group represented by Formulae 3g to 3j,

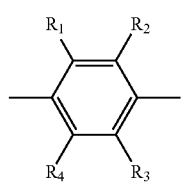

Formula 3a

-continued

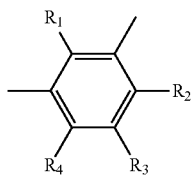
Formula 3b

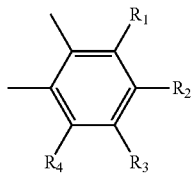
Formula 3c

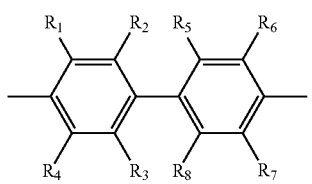
Formula 3d

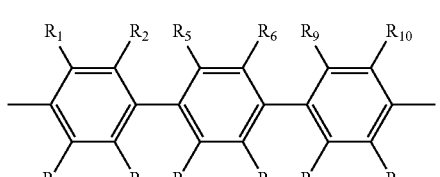
Formula 3e

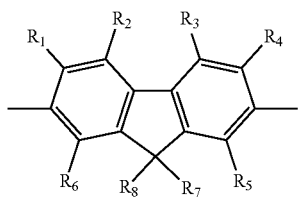
Formula 3f

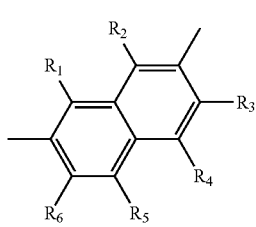
Formula 3g

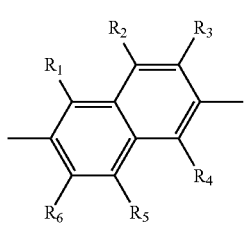
Formula 3h

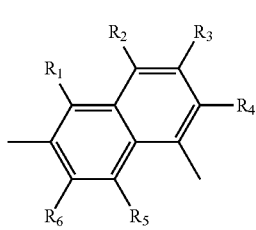
Formula 3i

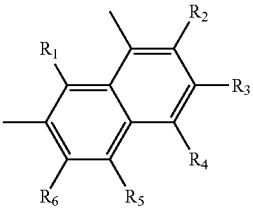
Formula 3j wherein, in Formulae 3a to 3j, $R_1$, $R_2$, $R_3$, $R_4$, $R_5$, $R_6$, $R_7$, $R_8$, $R_9$, $R_{10}$, $R_{11}$, and $R_{12}$ are each independently a hydrogen, a halogen, a hydroxy group, or a substituted or unsubstituted C1-C10 alkyl group, $R_c$, and $R_d$ are each independently a hydroxy group, and $R_e$ is a halogen;

A1, A2, and A3 are each independently a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L1, L2, L3, L4, L5, L6, L7, and L8 are each independently —C(=O)O— or —OC(=O)—,

E1, E2, and E are each independently an epoxy-containing group, a1, a4, b1, b2, b3, b4, c1, and c2 are each independently 0 or 1, and a2, a3, a5, a6, and a7 are each independently 1 or 2.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
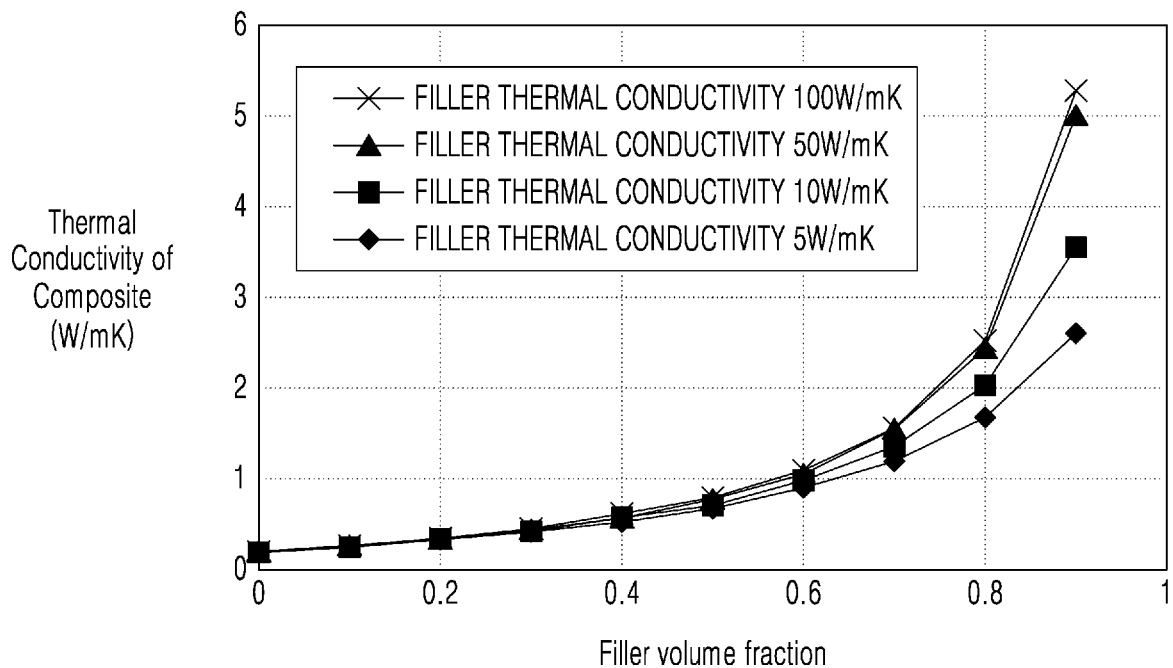
FIG. 1 is a graph that shows changes in thermal conductivity of a compound according to thermal conductivity of a filler.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list, for example, "at least one of a, b, or c" indicates only a, only b, only c, both a and b, both a and c, both b and c, all of a, b, and c, or variations thereof.

Various example embodiments will now be described with reference to the accompanying drawings. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Like reference numerals in the drawings denote like elements.

It will be understood that when a component is referred to as being "on" another component, the component can be directly on the other component or intervening components may be present thereon. In contrast, when a component is referred to as being "directly on" another component, an intervening component is not present therebetween.

While such terms as "first," "second," "third," etc., may be used to describe various elements, components, regions, layers, and/or sections, such elements, components, regions, layers, and/or sections must not be limited to the above terms. The above terms are used only to distinguish one element, component, region, layer, or section from another element, component, region, layer, or section. Therefore, a first element, component, region, layer, or section described hereinafter may be referred to as a second element, component, region, layer, or section without departing from the teachings of the present specification.

The terms used in the present specification are merely used to describe particular embodiments, and are not intended to limit the inventive concept. An expression used in the singular encompasses the expression of the plural including "at least one," unless it has a clearly different meaning in the context. The term "at least one" should not be understood as limiting to the singular. As used herein, the term "or" means "and/or," the term "and/or" includes any and all combinations of one or more of the associated list items. It will be further understood that the terms "includes," "have," "comprises," "including," "having," and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," and "upper," may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations), and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments are described herein with reference to cross-sectional illustrations that are schematic illustrations of idealized example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated or described as flat may, typically, have rough and/or nonlinear features. Moreover, angles illustrated as sharp may be rounded. Thus, the regions illustrated in the figures are schematic in nature and their shapes are not intended to illustrate the actual shape of a region and are not intended to limit the scope of the present description.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, 5% of the stated value.

While particular embodiments are described, alternatives, modifications, variations, improvements, and substantial equivalents that are or may be presently unforeseen or unexpected may arise to applicants or those skilled in the art. Accordingly, the appended claims as filed and as they may be amended are intended to embrace all such alternatives, modification, variations, improvements, and substantial equivalents.

Hereinafter, according to an embodiment, an epoxy compound, a composition prepared from the epoxy compound, a semiconductor device prepared from the epoxy compound, an electronic device prepared from the epoxy compound, an article prepared from the epoxy compound, and a method of preparing the article will be described in detail. Composition (I)

An epoxy compound according to an embodiment is an epoxy compound including an aromatic ring represented by Formula 1 or Formula 2:

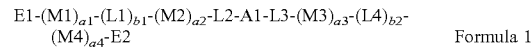

Formula 1

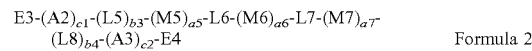

Formula 2

In Formulae 1 and 2,

M1, M4, M5, and M7 are each independently an arylene group represented by Formula 3a to 3j, M2, M3, and M6 are each independently a naphthalene group represented by Formula 3g to 3j,

Formula 3a

-continued

Formula 3b
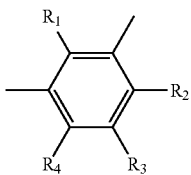

Formula 3c
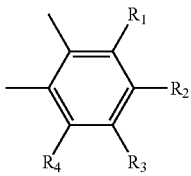

Formula 3d
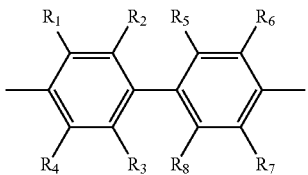

Formula 3e
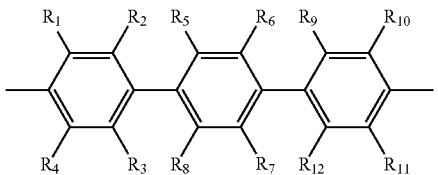

Formula 3f
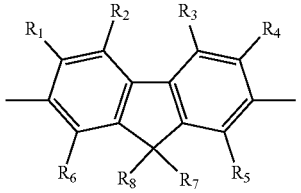

Formula 3g
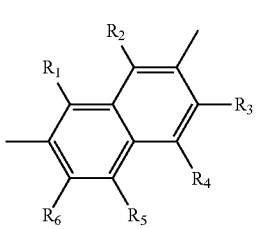

Formula 3h
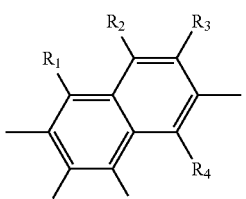

Formula 3i
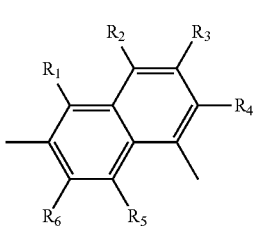

Formula 3j
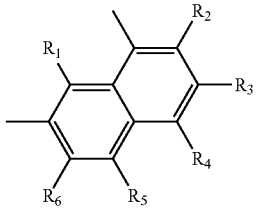

wherein, in Formulae 3a to 3j, $R_1$, $R_2$, $R_3$, $R_4$, $R_5$, $R_6$, $R_7$, $R_8$, $R_9$, $R_{10}$, $R_{11}$, and $R_{12}$ are each independently a hydrogen, a halogen, a hydroxy group, or a substituted or unsubstituted C1-C10 alkyl group;

A1, A2, and A3 are each independently a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L1, L2, L3, L4, L5, L6, L7, and L8 are each independently —C(=O)—, —S(=O)—, —C(=O)O—, —OC(=O)—, —S(=O)O—, —OS(=O)—, —O—C(=O)O—, —(CH$_2$)$_2$—C(=O)—, —C(=O)—(CH$_2$)$_2$—, —C(=O)—CH=CH—, —CH=CH—C(=O)—, —CH=N—, —N=CH—, —NH—C(=O)O—, —C(=O)—NH—, or —OC(=O)—NH—S(=O)O—, E1, E2, E3, and E4 are each independently an epoxy-containing group, a1, a4, b1, b2, b3, b4, c1, and c2 are each independently 0 or 1, and a2, a3, a5, a6, and a7 are each independently 1 or 2.

In Formula 1 and Formula 2, for example, L1, L2, L3, L4, L5, L6, L7, and L8 are each independently —C(=O)O— or —OC(=O)—.

In Formula 1 and Formula 2, A1, A2, and A3 may be each independently, for example, a C4-C12 alkylene group unsubstituted or substituted with a halogen, a C4-C12 alkenylene group unsubstituted or substituted with a halogen, a C4-C12 alkynylene group unsubstituted or substituted with a halogen, a C4-C12 alkadienylene group unsubstituted or substituted with a halogen, or a (poly)oxyalkylene group containing a C1-C5 alkylene group unsubstituted or substituted with a halogen. The halogen may be, for example, F, Cl, Br, or I. The halogen may be, for example, F.

The resin is generally a thermal insulator, and a thermal conductivity of the resin is about 0.2 Watts per meter Kelvin (W/mK) or less. Heat is transferred in a resin, which is a thermal insulator, by vibration transmission of phonons, but a thermal conductivity of the resin may become low because of a scattering of phonons. A thermal conductivity of a resin that is used as a semiconductor package material may be, for example, in a range of about 0.1 W/mK to about 0.2 W/mK. Even when a filler having a high thermal conductivity is added to the resin, an increase in thermal conductivity of the compound (e.g., epoxy molding compound) is not significant. For example, FIG. 1 is a graph that shows changes in thermal conductivity of a compound (e.g., epoxy molding compound) according to thermal conductivity of a filler. FIG. 1 shows that a thermal conductivity of a compound including a filler and a resin (e.g., epoxy molding compound) as an amount of the filler increased from about 1 vol % to about 90 vol % in the resin having a thermal conductivity of about 0.2 W/mK, where the results are calculated based on the Maxwell Model. As shown in FIG. 1, at an amount of the filler of about 90 vol %, a thermal conductivity of the compound (e.g., epoxy molding compound) converges to about 5 W/mK even when a thermal conductivity of the filler increases to about 50 W/mK or more. That is, in the compound including the filler and the resin (e.g., epoxy molding compound), a thermal conductivity of the compound converges to about 5 W/mK and does not increase any higher even when a thermal conductivity of the filler increases to about 100 W/mK.

Figure 2:
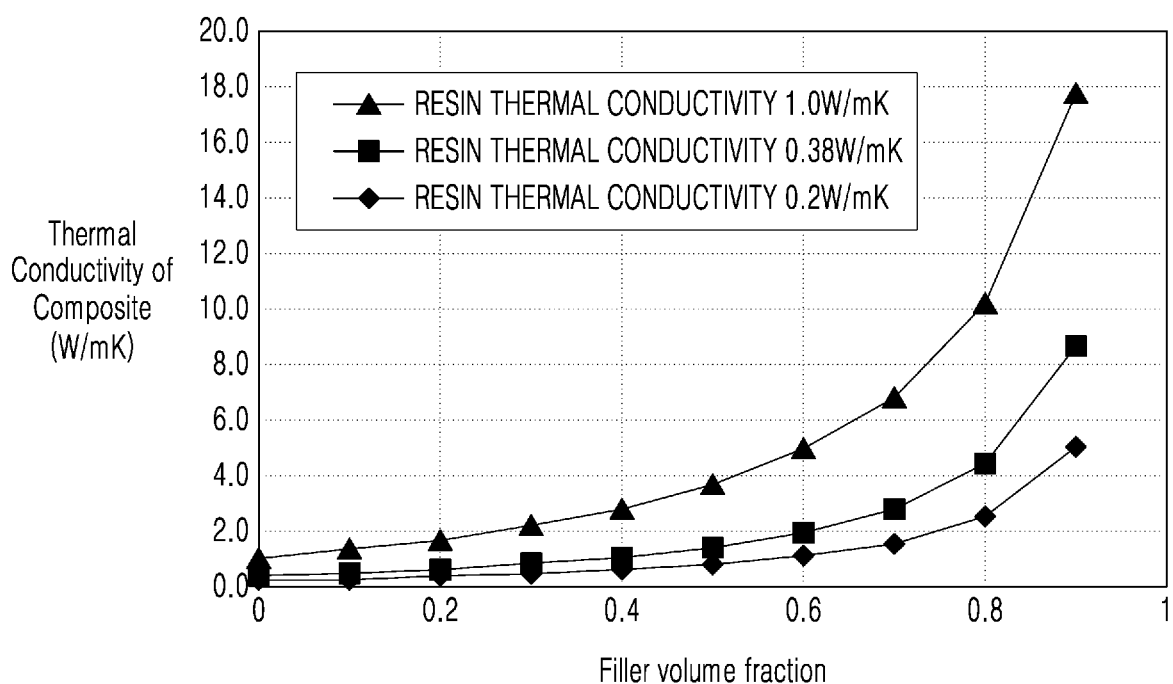
FIG. 2 is a graph that shows changes in thermal conductivity of a compound according to thermal conductivity of a resin.

In an embodiment, the epoxy compound including an aromatic ring represented by Formula 1 or Formula 2 has a mesogenic unit that contains a plurality of aromatic rings in the main chain. While not wishing to be bound by theory, it is understood that as the plurality of aromatic rings in the mesogenic unit form π-π stacking and intermolecular hydrogen bonding, chain stiffness of the main chain of the epoxy compound may increase, and molecular ordering of the epoxy compound may increase. As a result, a phonon transfer pathway may be provided in the resin, which is an epoxy compound and/or its cured product. Thus, thermal conductivity of the epoxy compound and/or its cured product may increase. In an embodiment, the epoxy compound including an aromatic ring represented by Formula 1 or Formula 2 may further include a spacer having flexibility between the mesogenic units or on one surface of the mesogenic unit. As the spacer is further introduced in the epoxy compound, for example, a liquid crystal like structure such as a smectic phase may be formed. Molecular ordering of an epoxy compound and/or and a resin prepared therefrom may increase by including a high ordered domain such as the liquid crystal like structure. As a result, phonon scattering in the resin, which is an epoxy compound and/or its cured product, may be suppressed. In an embodiment, the epoxy compound including an aromatic ring represented by Formula 1 or Formula 2 has a mesogenic unit and a spacer linked by an ester bond. As the mesogenic unit and the spacer are linked by an ester bond, liquid crystallinity of the epoxy compound including an aromatic ring represented by Formula 1 or Formula 2 may further be improved. In an embodiment, thermal conductivity of the resin, which is an epoxy compound and/or its cured product may further be increased. Therefore, when thermal conductivity of the resin, which is a cured product obtained from the epoxy compound represented by Formula 1 and/or Formula 2, is high, the thermal conductivity of the compound including the resin (e.g., epoxy molding compound) was significantly increased. For example, FIG. 2 is a graph that shows changes in thermal conductivity of the compound (e.g., epoxy molding compound) according to thermal conductivity of the resin. FIG. 2 shows the results changes in a thermal conductivity value of a compound including a filler and a resin according to an amount of the filler while a thermal conductivity of an $Al_2O_3$ filler is fixed to a thermal conductivity of about 50 W/mK and a thermal conductivity of the resin is increased from about 0.2 W/mK to about 1.0 W/mK, where the results are calculated based on the Maxwell Model. As shown in FIG. 2, at an amount of the filler of about 90 vol %, a thermal conductivity of the compound (e.g., epoxy molding compound) increased up to about 18 W/mK, when a thermal conductivity of the resin is increased from about 0.2 W/mK to about 1.0 W/mK.

The epoxy compound including an aromatic ring represented by Formula 1 may be, for example, an epoxy compound represented by one of Formulae 4a to 4f

| | |
|---|---|
| E1-M2-L2-A1-L3-M3-E2 | Formula 4a |
| E1-M1-L1-M2-L2-A1-L3-M3-E2 | Formula 4b |
| E1-M2-L2-A1-L3-M3-L4-M4-E2 | Formula 4c |
| E1-M1-L1-M2-L2-A1-L3-M3-L4-M4-E2 | Formula 4d |
| E1-M1-M2-L2-A1-L3-M3-L4-M4-E2 | Formula 4e |
| E1-M1-L1-M2-L2-A1-L3-M3-M4-E2 | Formula 4f |

In Formulae 4a to 4f,

M1 and M4 are each independently an arylene group represented by Formulae 3a to 3j, M2 and M3 are each independently a naphthalene group represented by Formulae 4a to 4d, A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L1, L2, L3, and L4 are each independently —C(=O)O— or —OC(=O)—,

E1, E2, E3, and E4 are each independently an epoxy-containing group.

The epoxy compound including an aromatic ring represented by Formula 2 may be, for example, an epoxy compound represented by one of Formulae 5a to 5f:

| | |
|---|---|
| E3-A2-L5-M5-L6-M6-L7-M7-L8-A3-E4 | Formula 5a |
| E3-M5-L6-M6-L7-M7-L8-A3-E4 | Formula 5b |
| E3-A2-L5-M5-L6-M6-L7-M7-E4 | Formula 5c |
| E3-A2-L6-M6-L7-M7-L8-A3-E4 | Formula 5d |
| E3-A2-L5-M5-L6-M6-L7-A3-E4 | Formula 5e |

In Formulae 5a to 5f,

M5 and M7 are each independently an arylene group represented by Formulae 3a to 3j, M6 is a naphthalene group represented by Formulae 4a to 4d, A2 and A3 are each independently a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L5, L6, L7, and L8 are each independently —C(=O)O— or —OC(=O)—,

E1, E2, E3, and E4 are each independently an epoxy-containing group.

In the epoxy compound represented by one of Formulae 1 to 5e, A1, A2, and A3 may be each independently, for example, an ethylene group, a propylene group, a butylene group, a pentylene group, a hexylene group, a heptylene group, an octylene group, a nonylene group, a decylene group, an undecylene group, a dodecylene group, a butadienylene group, a pentadienylene group, a hexadienylene group, a heptadienylene group, an octadienylene group, a nonadienylene group, a decadienylene group, an undecadienylene group, a dodecadienylene group, or —$(CH_2O)p$— (where p is a real number of 1 to 10).

In the epoxy compound represented by one of Formulae 1 to 5e, L1, L2, L3, L4, L5, L6, L7, and L8 may be each independently, for example, —C(=O)O— or —OC(=O)—.

In the epoxy compound represented by one of Formulae 1 to 5e, E1 and E2 may be each independently, for example, epoxy-containing groups represented by Formulae 6a to 6d:

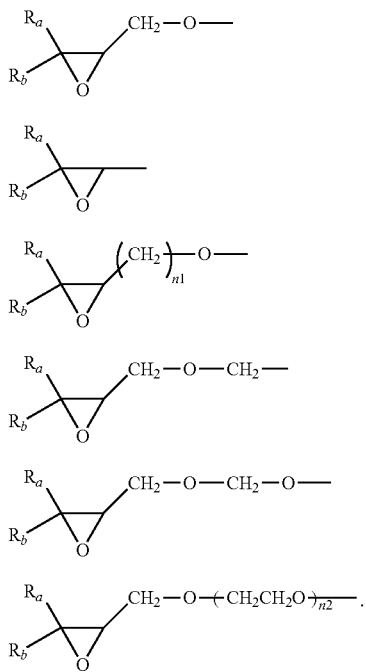

In Formulae 6a to 6f, $R_a$, and $R_b$ are each independently a hydrogen, a halogen, a hydroxy group, or a substituted or unsubstituted C1-C10 alkyl group, n1 is 2 to 10, and n2 is 1 to 10.

In the epoxy compound represented by one of Formulae 1 to 5e, M1, M4, M5, and M7 may be each independently an arylene group represented by Formulae 7a to 7j, M2, M3, and M6 may be each independently a naphthalene group represented by Formulae 7g to 7j, and E1 and E may be each independently epoxy-containing groups represented by Formulae 8a to 8f:

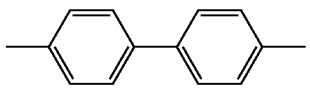

Formula 7a

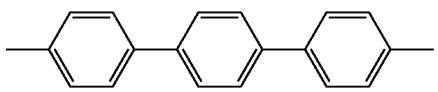

Formula 7b

Formula 7c

Formula 7d

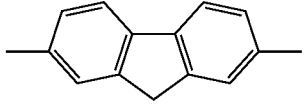

Formula 7e

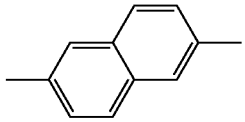

Formula 7f

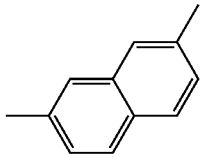

Formula 7g

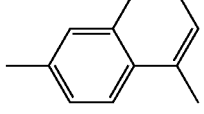

Formula 7h

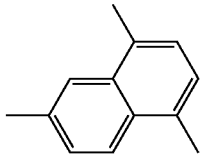

Formula 7i

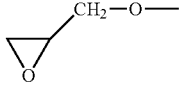

Formula 7j

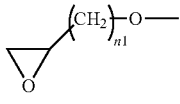

Formula 8a

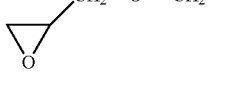

Formula 8b

Formula 8c

Formula 8d

Formula 8e

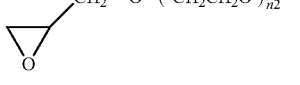

Formula 8f

In Formulae 7a to 7j and 8a to 8f, n1 is 1 to 10, and n2 is 2 to 10.

The epoxy compound represented by Formula 1 may be, for example, an epoxy compound represented by one of Formulae 9a to 9p:
Formula 9a
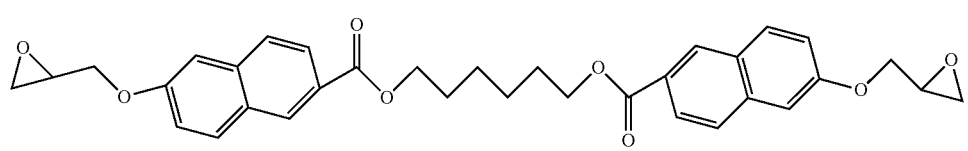
Formula 9b
Formula 9c
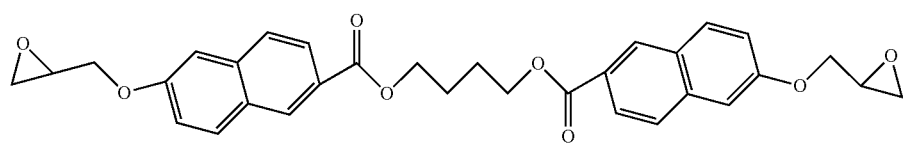
Formula 9d
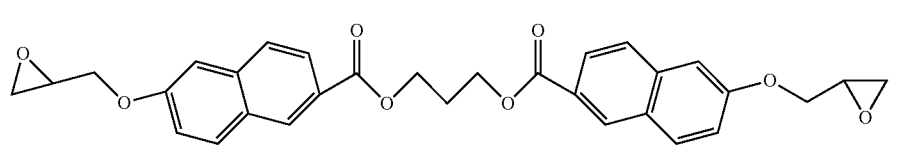
Formula 9e
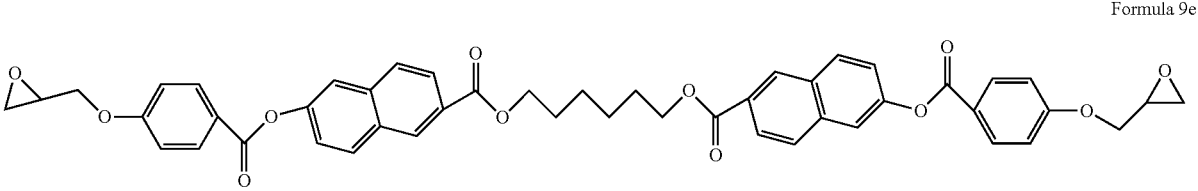
Formula 9f
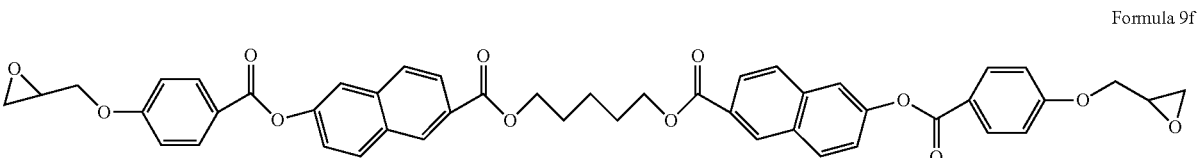
Formula 9g
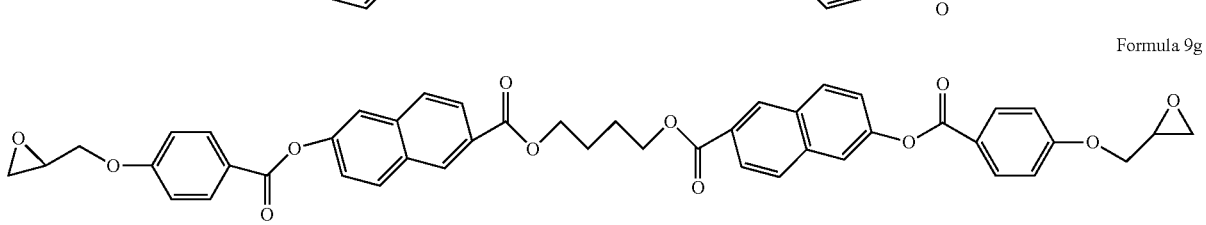
Formula 9h
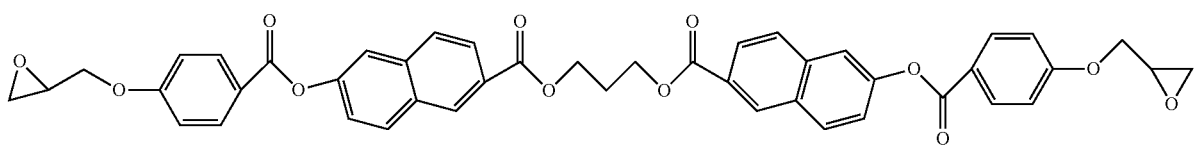
Formula 9i
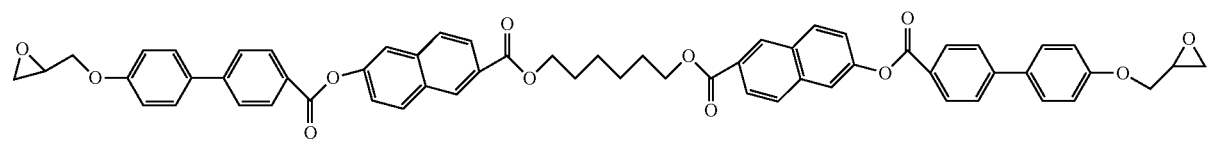

Formula 9j
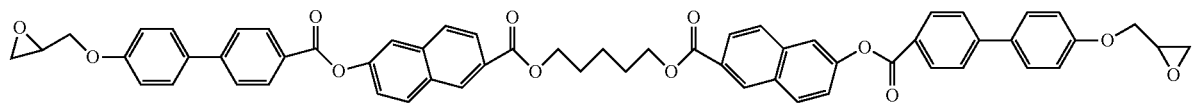
Formula 9k
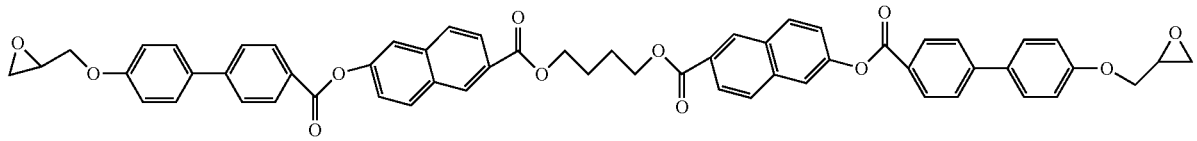
Formula 9l
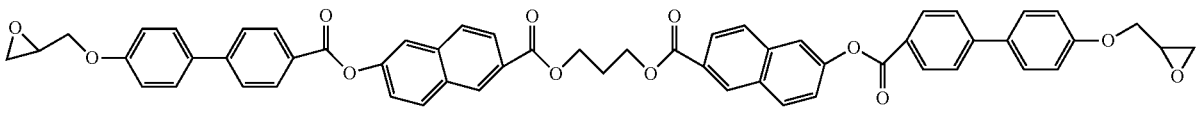
Formula 9m
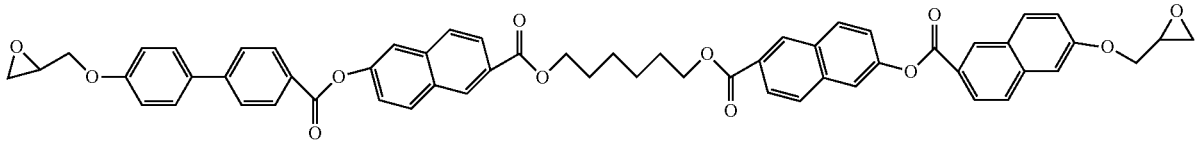
Formula 9n
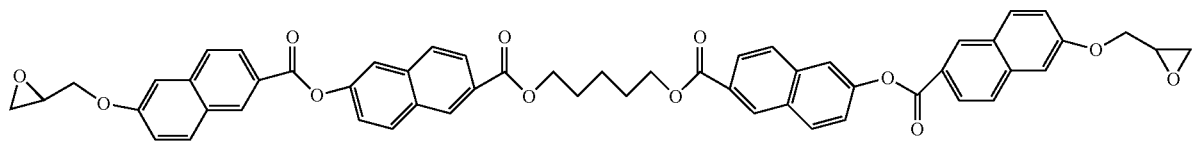
Formula 9o
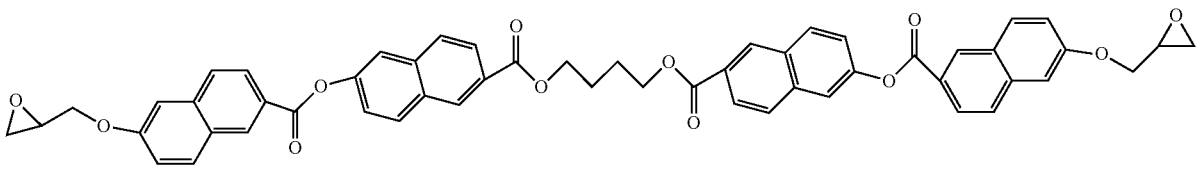
Formula 9p
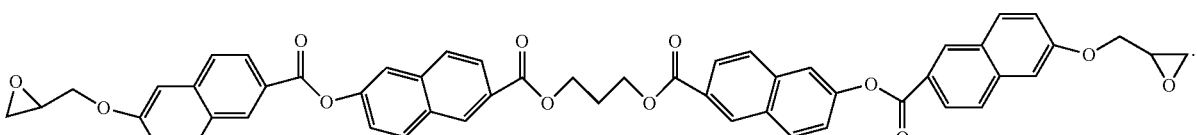
The epoxy compound represented by Formula 2 may be, for example, an epoxy compound represented by one of Formulae 10a to 10p:
Formula 10a
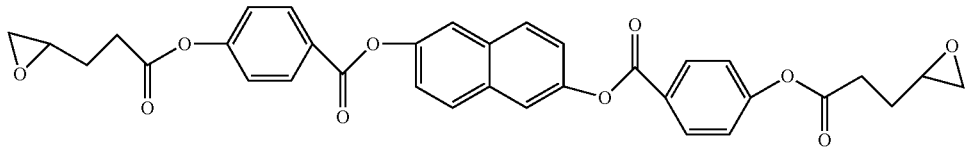

-continued
Formula 10b
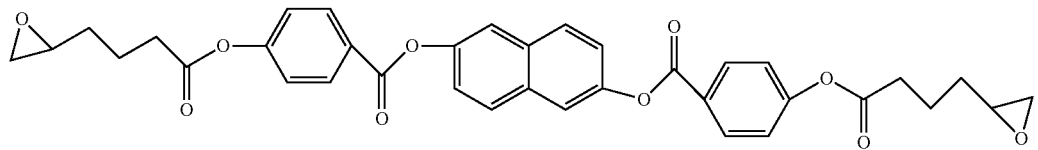
Formula 10c
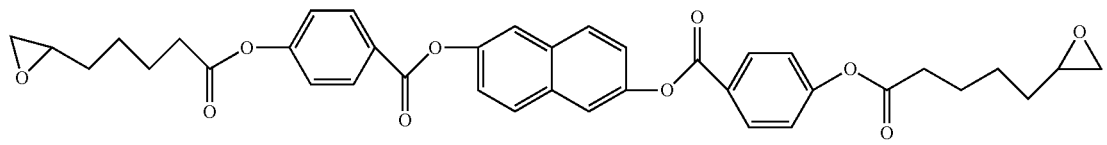
Formula 10d
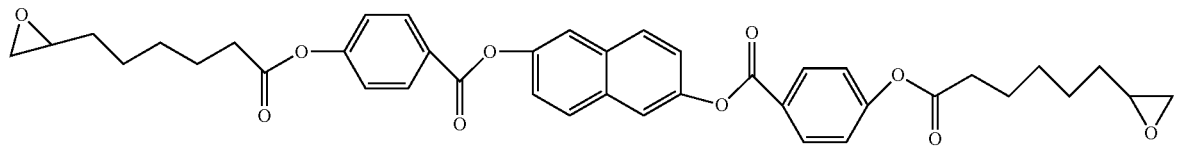
Formula 10e
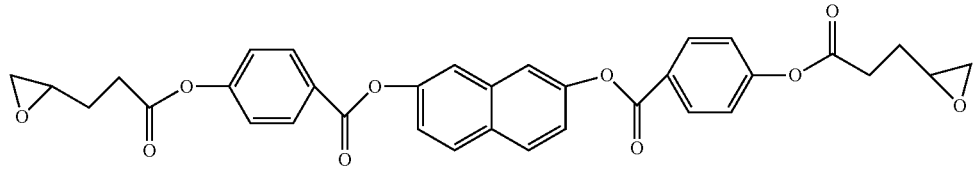
Formula 10f
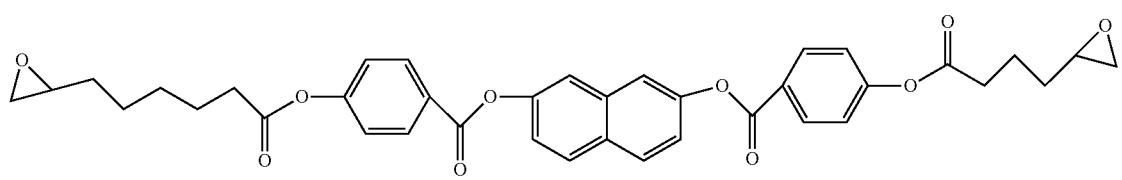
Formula 10g
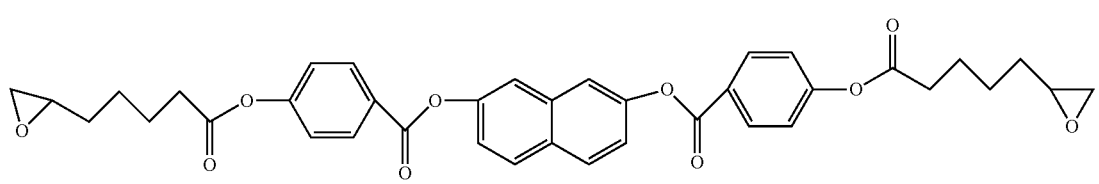
Formula 10h
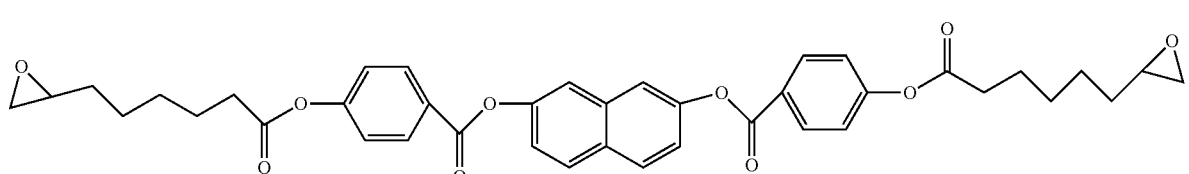
Formula 10i
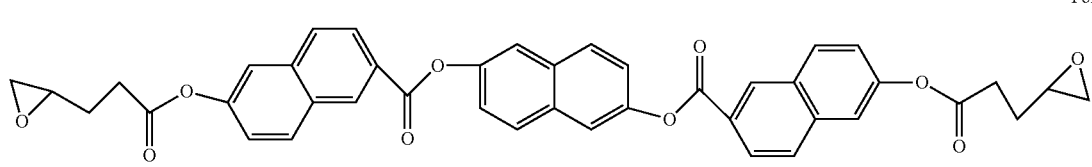
Formula 10j
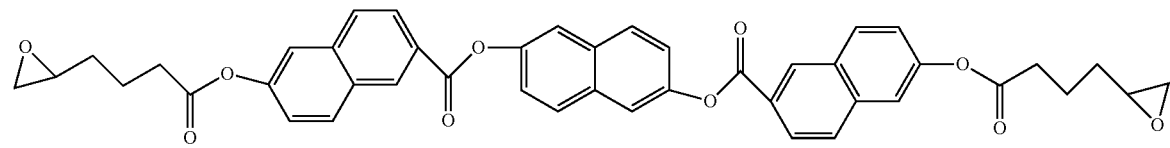

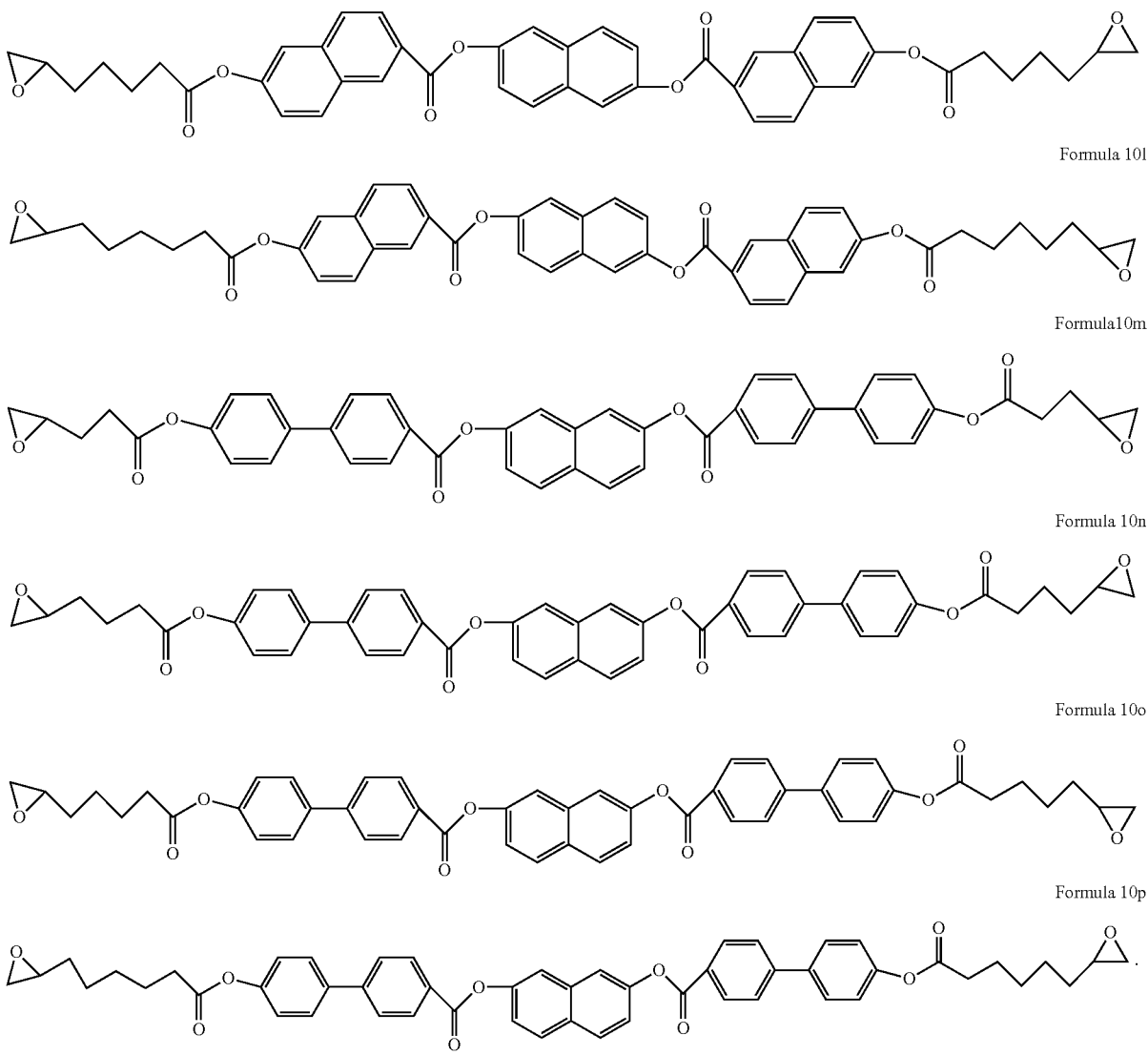

By including a spacer A1, A2, or A3, the epoxy compound represented by Formula 1 or Formula 2 may have a melting temperature lower than that of any conventional or any suitable epoxy compound. The melting temperature of the epoxy compound represented by Formula 1 or Formula 2 may be, for example, about 200° C. or lower, about 195° C. or lower, about 190° C. or lower, about 185° C. or lower, about 180° C. or lower, about 175° C. or lower, about 170° C. or lower, about 165° C. or lower, about 160° C. or lower, about 155° C. or lower, about 150° C. or lower, about 145° C. or lower, about 140° C. or lower, about 135° C. or lower, or about 130° C. or lower. The melting temperature of the epoxy compound represented by Formula 1 or Formula 2 may be, for example, in a range of about 30° C. to about 200° C., about 50° C. to about 195° C., about 70° C. to about 190° C., about 90° C. to about 185° C., about 100° C. to about 180° C., about 100° C. to about 175° C., about 100° C. to about 170° C., about 100° C. to about 165° C., about 100° C. to about 160° C., about 100° C. to about 155° C., about 100° C. to about 150° C., about 100° C. to about 145° C., about 100° C. to about 140° C., about 100° C. to about 135° C., or about 100° C. to about 130° C. When the epoxy compound represented by Formula 1 or Formula 2 has a melting point within these ranges, a curing temperature of the epoxy resin composition obtained from the epoxy compound represented by Formula 1 or Formula 2 may be lowered. As the epoxy resin composition has such a low curing temperature, damages such as thermal deformation of electronic components that may occur during a curing process at a high-temperature may be prevented.

Epoxy Resin Composition

An epoxy resin composition according to an embodiment includes an epoxy compound represented by one of Formula 1, Formula 2, Formulae 4a to 4f, Formulae 5a to 5e, Formulae 9a to 9p, and Formulae 10a to 10p; and a curing agent. When the epoxy resin composition includes the epoxy compound, a cured product of the epoxy resin composition may provide improved thermal conductivity. The epoxy resin composition may be molded into various forms.

The curing agent in the epoxy resin composition may be, for example, an amine-based curing agent, an acid anhydride-based curing agent, a polyamine curing agent, a polysulfide curing agent, a phenol novolak type curing agent, a bisphenol A type curing agent, or a dicyandiamide curing agent, but embodiments are not limited thereto. The curing agent may be, for example, a polyfunctional phenol-based curing agent. The polyfunctional phenol-based curing agent may be, for example, a compound having at least three phenolic hydroxyl groups, and the compound may have the following structure.

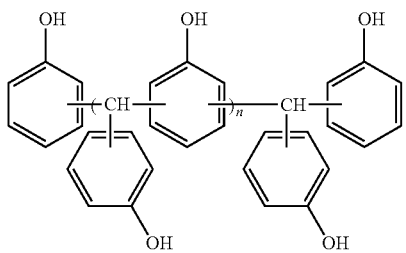

wherein n in the formula above is an integer of 1 to 10000.

A number average molecular weight of the polyfunctional phenol-based curing agent may be, for example, in a range of about 300 daltons to about 30000 daltons, about 400 daltons to about 30000 daltons, about 600 daltons to about 10000 daltons, or about 800 daltons to about 10000 daltons.

An amount of the curing agent may be in a range of about 0.1 parts to about 10 parts by weight, about 0.1 parts to about 5 parts, or about 0.1 parts to about 1 part by weight based on 100 parts by weight of the epoxy resin composition, but embodiments are not limited thereto. When an amount of the curing agent is within these ranges, deterioration of insulating characteristics of the compound may be prevented by minimizing an amount of an unreacted curing agent while increasing a curing rate of the epoxy resin composition.

The epoxy resin composition may not include metal ions. The epoxy resin composition may substantially not include metal ions. An amount of the metal ions in the epoxy resin composition may be about 10 parts per million (ppm) or less, about 5 ppm or less, about 3 ppm or less, about 2 ppm or less, or about 1 ppm or less. For example, the amount of the metal ions in the epoxy resin composition may be about 0.1 ppm to about 10 ppm, about 0.5 ppm to about 10 ppm, about 1 ppm to about 10 ppm, about 2 ppm to about 10 ppm, about 3 ppm to about 10 ppm, about 4 ppm to about 10 ppm, about 5 ppm to about 10 ppm, about 6 ppm to about 10 ppm, about 7 ppm to about 10 ppm, about 8 ppm to about 10 ppm, or about 9 ppm to about 10 ppm.

The epoxy compound represented by Formula 1 or 2 used in the epoxy resin composition may not include metal ions as impurities. The epoxy compound represented by Formula 1 or 2 used in the epoxy resin composition may not include metal ions as impurities. An amount of the metal ions as impurities in the epoxy resin composition may be about 3 ppm or less, about 2 ppm or less, about 1 ppm or less, about 0.5 ppm or less, or about 0.1 ppm or less. For example, the amount of the metal ions as impurities in the epoxy resin composition may be about 0.1 ppm to about 3 ppm, about 0.5 ppm to about 3 ppm, about 1 ppm to about 3 ppm, or about 2 ppm to about 3 ppm.

The epoxy resin composition may further include, for example, a filler, and the filler may be an inorganic filler, an organic filler, or a combination thereof.

The inorganic filler may be, for example, at least one of silicon oxide, calcium carbonate, magnesium carbonate, alumina, magnesia, clay, alumina ($Al_2O_3$), titania ($TiO_2$), talc, calcium silicate, antimony oxide, glass fiber, or eucryptite ceramic, but embodiments are not limited thereto. The eucryptite ceramic may be a crystallized glass formed of $Li_2O$, $Al_2O_3$, and $SiO_2$ components. The organic filler may include, for example, at least one of polyethylene imine, ethylene glycol, or polyethylene glycol, but embodiments are not limited thereto. The filler may be an inorganic filler in terms of having high thermal conductivity, strengthening the rigidity of the compound, and reducing the linear expansion coefficient.

An amount of the filler may be, for example, in a range of about 20 weight % (wt %) to about 99 wt %, about 30 wt % to about 99 wt %, about 40 wt % to about 99 wt %, about 50 wt % to about 99 wt %, about 60 wt % to about 99 wt %, about 70 wt % to about 99 wt %, about 80 wt % to about 99 wt %, about 90 wt % to about 99 wt %, or about 95 wt % to about 99 wt % based on the total weight of the epoxy resin composition. When an amount of the filler in the epoxy resin composition is within these ranges, properties such as moldability, low-stress property, high-temperature strength, and thermal expansion coefficient may be effectively controlled.

The epoxy resin composition may further include at least one additive from a curing accelerator, a reaction modifier, a releasing agent, a coupling agent, a stress reliever, or an auxiliary flame retardant. The additives may be each independently included in the epoxy resin composition at an amount, for example, in a range of about 0.1 parts to about 10 parts by weight, about 0.1 parts to about 5 parts by weight, about 0.1 parts to about 3 parts by weight, or about 0.1 parts to about 1 part by weight based on 100 parts by weight of the epoxy resin composition.

The epoxy resin composition may further include any conventional or any suitable epoxy resins in addition to the epoxy compound according to an embodiment. When the epoxy resin composition includes any conventional or any suitable epoxy resins, thermal expansion coefficient, warpage, and processing characteristics of the compound may further be improved, and peeling strength of the epoxy resin composition may also be improved. Examples of the conventional or suitable epoxy resins may include a biphenyl epoxy resin, a novolac epoxy resin, a dicyclopentadienyl epoxy resin, a bisphenol epoxy resin, a terpene epoxy resin, an aralkyl epoxy resin, a multi-functional epoxy resin, a naphthalene epoxy resin, and a halogenated epoxy resin. These epoxy resins may be used alone or in a mixture of two or more. An amount of the conventional or suitable epoxy resin may be, for example, in a range of about 1 part to about 15 parts by weight, about 1 part to about 10 parts by weight, about 1 part to about 5 parts by weight based on 100 parts by weight of the epoxy resin composition, but embodiments are not limited thereto. When the epoxy resin composition further includes the conventional or suitable epoxy resin at an amount within these ranges, for example, adhesion between the epoxy resin composition and a substrate on a semiconductor package, thermal expansion coefficient, and processing properties of the compound may further be improved.

The epoxy resin composition may be used for various purposes. For example, the epoxy resin composition may be used as an encapsulating resin composition or a fixing resin composition. The encapsulating resin composition (a resin composition for encapsulating an electronic compartment) may be, for example, a resin composition for encapsulating a semiconductor capable of encapsulating electronic compartments such as a semiconductor chip and used in a semiconductor package, a resin composition for encapsulating electronic control units for vehicles, in which a substrate having electronic compartments mounted thereon is encapsulated, or a resin composition for encapsulating a sensor, a sensor module, a camera, a camera module, a module with an indicator, a module with a battery, or a module with a coin battery. The fixing resin composition may be, for example, a fixing resin composition of a motor compartment. The fixing resin composition of a motor compartment may be, for example, a resin composition for fixing a rotor core magnet or for fixing a stator. The epoxy resin composition may be used for purposes other than those described above.

A method of preparing an epoxy resin composition is not particularly limited. The method of preparing an epoxy resin composition may include selecting ingredients such as an epoxy compound and a curing agent; and mixing the ingredients. For example, an epoxy compound appropriate for an epoxy resin composition may be represented by Formula 1 and/or Formula 2. Subsequently, the epoxy compound may be mixed with other ingredients such as a curing agent or an additive to prepare a mixture as an epoxy resin composition.

In the mixing of the ingredients, the mixture may be obtained using any suitable method. Also, the mixture may be, for example, melt-kneaded at a temperature lower than the curing temperature of the epoxy resin composition to obtain a kneaded product. As the kneading method, for example, a kneading extruder such as a monoaxial kneading extruder or a biaxial kneading extruder may be used or a roll-type kneader such as a mixing roll may be used, but the biaxial kneading extruder may be used. After cooling the kneaded product in the melted state, the kneaded product may be molded into a powdery, granular, tablet, or sheet shape. As a method of preparing a resin composition of a powdery shape, for example, a method of pulverizing a kneaded product using a pulverizing device may be used. The kneaded product may be molded on sheet and then pulverized. A device used in the pulverization may be, for example, a hammer mill, a mortar grinder, or a roll crusher. A method of preparing a resin composition having a granular shape or a powdery shape may include, for example, an assembly method represented by a hot-cut technique, in which a dice having a small diameter is installed on a discharge port of a kneading device, and the molten kneaded product discharged from the dice is cut into a predetermined length by a cutter. After preparing the resin composition having a granular shape or a powdery shape using the assembly method such as the hot-cut technique, degassing of the resin composition may be performed while the temperature of the resin composition is not much lowered.

Semiconductor Device

According to an embodiment, a semiconductor device includes a substrate; a semiconductor; and a cured product of an epoxy resin composition including a curing agent and an epoxy compound represented by Formula 1, an epoxy compound represented by Formula 2, or a combination thereof, a sealing portion including the cured product of the epoxy resin composition, a substrate portion including the cured product of the epoxy resin composition, a reinforcement portion including the cured product of the epoxy resin composition, or an adhesive portion including the cured product of the epoxy resin composition. When the semiconductor device includes at least one of the cured product, sealing portion, substrate portion, reinforcement portion, or adhesive portion, heat release characteristics of the semiconductor device may be improved, and as a result, thermal stability of the semiconductor device may be improved.

A thermal conductivity of the cured products of the epoxy resin compositions in the semiconductor device may be, for example, about 0.3 W/mK or more, about 0.35 W/mK or more, about 0.4 W/mK or more, about 0.45 W/mK or more, about 0.5 W/mK or more, about 0.55 W/mK or more, or about 0.6 W/mK or more. A thermal conductivity of the cured product of the epoxy resin composition in the semiconductor device may be, for example, in a range of about 0.3 W/mK to about 50 W/m K, about 0.3 W/mK to about 45 W/m K, about 0.3 W/mK to about 40 W/m K, about 0.3 W/mK to about 35 W/m K, about 0.3 W/mK to about 30 W/m K, about 0.3 W/mK to about 25 W/m K, about 0.3 W/mK to about 20 W/m K, or about 0.3 W/mK to about 15 W/mK. A thermal conductivity of the cured product of the epoxy resin composition in the semiconductor device may be, for example, in a range of about 0.35 W/mK to about 40 W/mK, about 0.4 W/mK to about 35 W/mK, about 0.45 W/mK to about 30 W/m K, about 0.50 W/mK to about 20 W/m K, about 0.55 W/mK to about 15 W/m K, or about 0.6 W/mK to about 10 W/mK. When a thermal conductivity of at least one of the cured product, sealing portion, substrate portion, reinforcement portion, or adhesive portion in the semiconductor device is within these ranges, thermal stability of the semiconductor device may further be improved.

Figure 3:
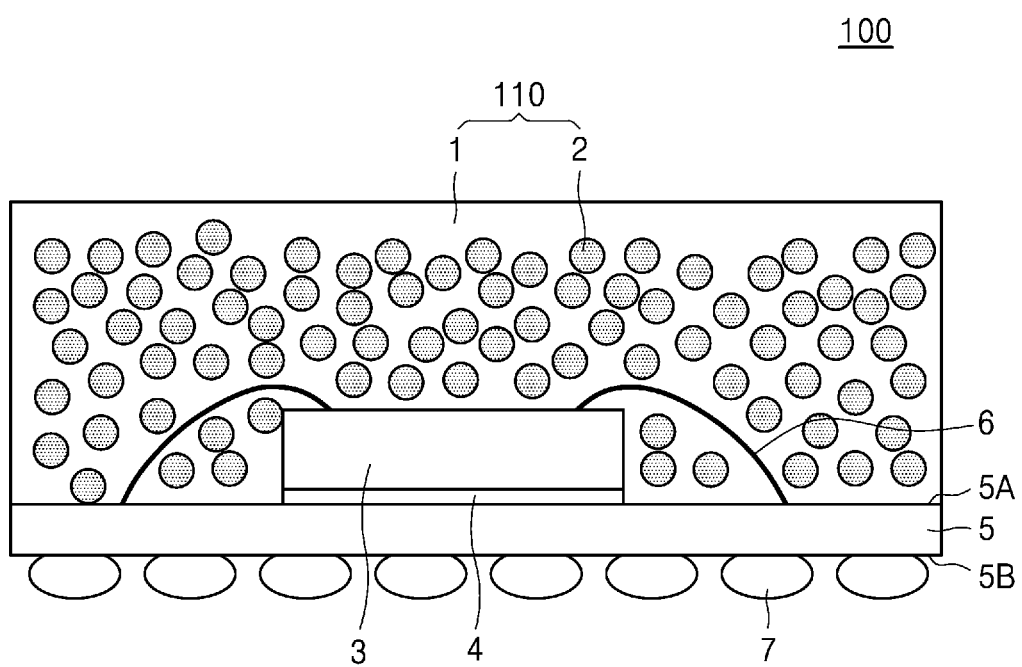
FIG. 3 is a schematic cross-sectional view of a semiconductor device according to an embodiment.

The semiconductor device may be, for example, a semiconductor package. Referring to FIG. 3, a semiconductor package 100 includes a substrate 5; a die attach film 4 placed on the substrate 5; a semiconductor chip 3 placed on the substrate 5 and attached to the substrate 5 through the die attach film 4; coupling portions 6 such as bonding wires that electrically connect the semiconductor chip 3 and the substrate 5; and a molding portion 110 that encapsulates the semiconductor chip 3 and the coupling portions 6 and for protecting the substrate 5 and an accommodation structure including the semiconductor chip 3 and the coupling portions 6 mounted on the substrate 5. The molding portion 110 is formed to completely encapsulate the semiconductor chip 3 and the coupling portions 6 on the substrate 5. The molding portion 110 may be prepared from the epoxy resin composition described herein. The molding portion 110 may include an epoxy resin 1 and fillers 2 dispersed in the epoxy resin 1. The molding portion 110 may have a form in which fillers dispersed in a resin matrix formed by curing an epoxy compound. A plurality of solder balls 7 that electrically connect the semiconductor chip 3 to an external circuit (not shown) are formed on a surface 5B in the substrate 5 opposite to an accommodation surface 5A on which the semiconductor chip 3 is mounted. In order to prepare a semiconductor package using an epoxy resin composition, for example, the semiconductor package 100 shown in FIG. 3, a process of forming the molding portion 110 that encapsulate the semiconductor chip 3 mounted on the substrate 5 may be performed using a low-pressure transfer molding process. In an embodiment, for example, an injection molding process or a casting process may be used instead of the low-pressure transfer molding process. The molding portion 110 formed using the epoxy resin composition may protect a region of the semiconductor chip 3 from moisture in the semiconductor package 100 and provide improved heat release characteristics. In an embodiment, the reliability of the semiconductor package 100 may be improved even in a humid environment.

Electronic Device

According to an embodiment, an electronic device includes a substrate; an electronic component; and a cured product of an epoxy resin composition including a curing agent, and an epoxy compound represented by Formula 1, an epoxy compound represented by Formula 2, or a combination thereof, a sealing portion including the cured product of the epoxy resin composition, a substrate portion including the cured product of the epoxy resin composition, a reinforcement portion including the cured product of the epoxy resin composition, or an adhesive portion including the cured product of the epoxy resin composition. When the electronic device includes at least one of the cured product, sealing portion, substrate portion, reinforcement portion, or adhesive portion, heat release characteristics of the electronic device may be improved, and as a result, thermal stability of the electronic device may be improved.

A thermal conductivity of the cured products of the epoxy resin compositions in the electronic device may be, for example, about 0.3 W/mK or more, about 0.35 W/mK or more, about 0.4 W/mK or more, about 0.45 W/mK or more, about 0.5 W/mK or more, about 0.55 W/mK or more, or about 0.6 W/mK or more. A thermal conductivity of the cured products of the epoxy resin compositions in the electronic device may be, for example, in a range of about 0.3 W/mK to about 50 W/mK, about 0.3 W/mK to about 45 W/mK, about 0.3 W/mK to about 40 W/mK, about 0.3 W/mK to about 35 W/mK, about 0.3 W/mK to about 30 W/mK, about 0.3 W/mK to about 25 W/mK, about 0.3 W/mK to about 20 W/mK, or about 0.3 W/mK to about 15 W/mK. A thermal conductivity of the cured products of the epoxy resin compositions in the electronic device may be, for example, in a range of about 0.35 W/mK to about 40 W/mK, about 0.4 W/mK to about 35 W/mK, about 0.45 W/mK to about 30 W/mK, about 0.50 W/mK to about 20 W/mK, about 0.55 W/mK to about 15 W/mK, or about 0.6 W/mK to about 10 W/mK. When a thermal conductivity of at least one of the cured product, sealing portion, substrate portion, reinforcement portion, or adhesive portion in the electronic device is within these ranges, thermal stability of the electronic device may further be improved.

Figure 4:
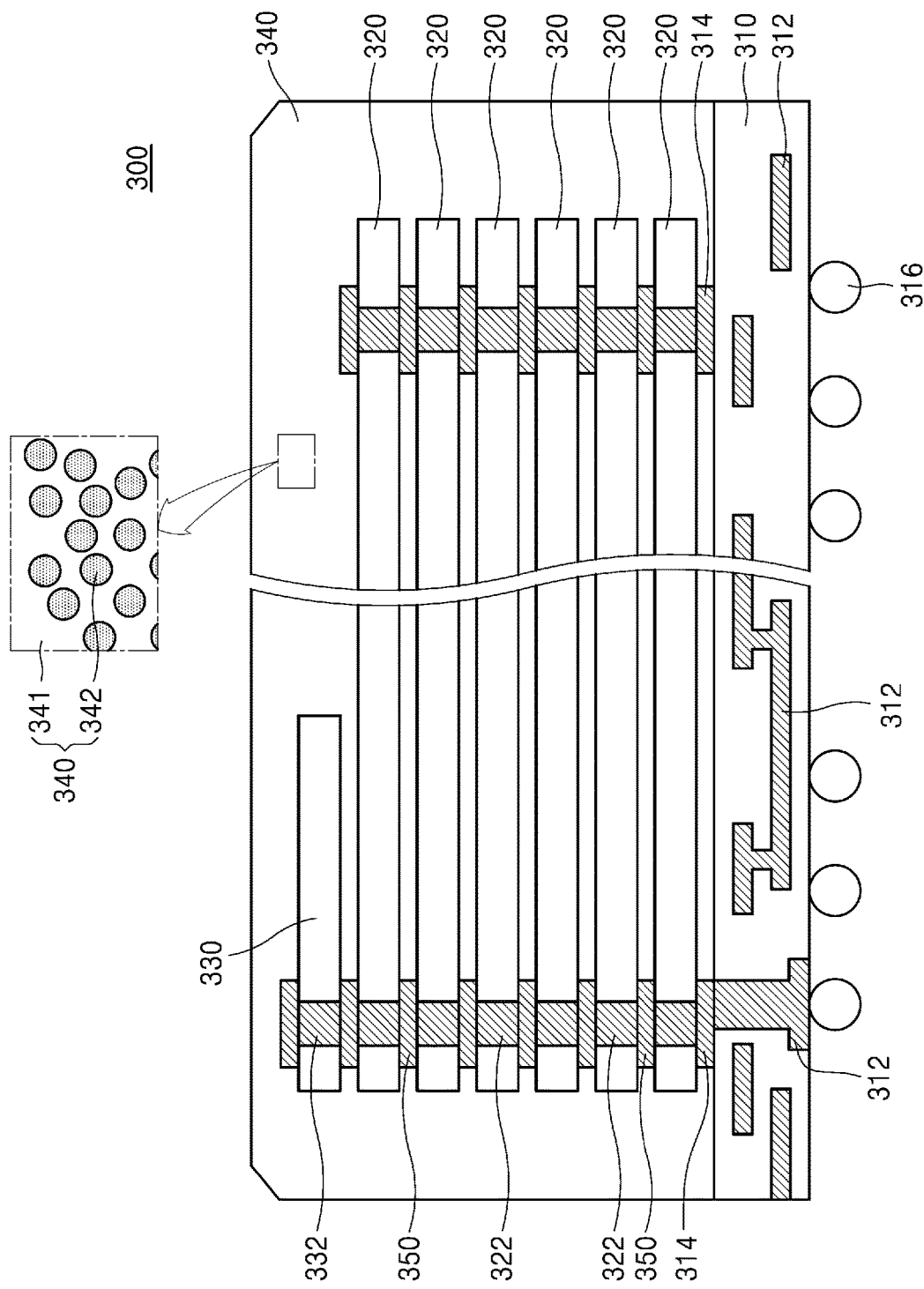
FIG. 4 is a schematic cross-sectional view of an electronic device according to an embodiment.
Figure 5:
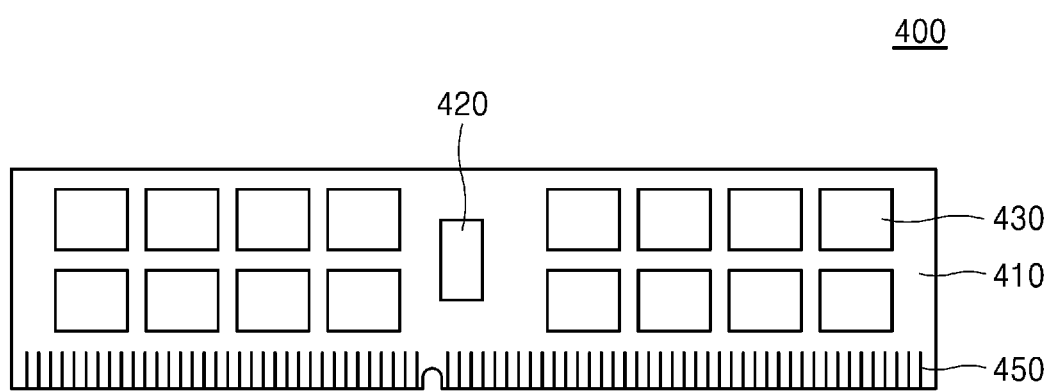
FIG. 5 is a schematic plan view of the electronic device according to an embodiment.

The electronic device may be, for example, an electronic control unit, a sensor, a sensor module, a camera, a camera module, a module with an indicator, a module with a coin battery, or a motor in which a substrate having electronic compartments mounted thereon is encapsulated. The electronic device may be, for example, an integrated circuit device having electronic components mounted thereon or a printed circuit board having electronic components mounted thereon. Referring to FIG. 4, an integrated circuit device 300 includes a plurality of semiconductor chips 320 sequentially stacked on a package substrate 310. A control chip 330 is connected on the plurality of semiconductor chips 320. A stack of the plurality of semiconductor chips 320 and the control chip 330 is sealed on the package substrate 310 by a molding portion 340. The molding portion 340 may have similar features with those of the molding portion 110 in FIG. 3. The molding portion 340 may be prepared using the epoxy resin composition described herein. The molding portion 340 includes an epoxy resin 341 and a plurality of fillers 342 dispersed in the epoxy resin 341. Details about the epoxy resin 341 and the fillers 342 may be the same with those of the epoxy resin 1 and the fillers 2 in FIG. 3. FIG. 4 shows an example structure in which the plurality of semiconductor chips 320 are vertically stacked. The plurality of semiconductor chips 320 may be arranged in a horizontal direction on the package substrate 310 or may be arranged in a combined structure of a vertical direction mounting and a horizontal direction mounting. The control chip 330 may be omitted. The package substrate 310 may be a flexible printed circuit board, a rigid printed circuit board, or a combination thereof. The package substrate 310 includes substrate internal distribution lines 312 and coupling terminals 314. The coupling terminals 314 may be formed on a surface of the package substrate 310. Solder balls 316 are formed on the other surface of the package substrate 310. The coupling terminals 314 are electrically connected to the solder balls 316 via the substrate internal distribution lines 312. The solder balls 316 may be replaced by conductive bumps or lead grid array (LGA). The plurality of semiconductor chips 310 and the control chip 330 may respectively include coupling structures 322 and 332. The coupling structures 322 and 332 may each be formed of, for example, a through silicon via (TSV) contact structure. The coupling structures 322 and 332 in the plurality of semiconductor chips 320 and the control chip 330 are electrically connected to the coupling terminals 314 of the package substrate 310 via coupling portions 350 such as bumps. The plurality of semiconductor chips 320 may each include system LSI, flash memory, DRAM, SRAM, EEPROM, PRAM, MRAM, or RRAM. The control chip 330 may include logic circuits such as a serializer/deserializer (SER/DES) circuit. Referring to FIG. 5, an integrated circuit device 400 includes a module substrate 410; and a control chip 420 and a plurality of semiconductor packages 430 mounted on the module substrate 410. A plurality of input/output terminals 450 are formed on the module substrate 410. The plurality of semiconductor package 430 includes at least one of the semiconductor package 100 of FIG. 3 or the integrated circuit device 300 of FIG. 4.

Article

According to an embodiment, an article includes a substrate; and a cured product of an epoxy resin composition including a curing agent, and an epoxy compound represented by Formula 1, an epoxy compound represented by Formula 2, or a combination thereof, a sealing portion including the cured product of the epoxy resin composition, a substrate portion including the cured product of the epoxy resin composition, a reinforcement portion including the cured product of the epoxy resin composition, or an adhesive portion including the cured product of the epoxy resin composition. When the article includes at least one of the cured product, sealing portion, substrate portion, reinforcement portion, or adhesive portion, heat release characteristics of the article may be improved, and as a result, thermal stability of the article may be improved.

A thermal conductivity of the cured products of the epoxy resin compositions in the article may be, for example, about 0.3 W/mK or more, about 0.35 W/mK or more, about 0.4 W/mK or more, about 0.45 W/mK or more, about 0.5 W/mK or more, about 0.55 W/mK or more, or about 0.6 W/mK or more. A thermal conductivity of the cured products of the epoxy resin compositions in the article may be, for example, in a range of about 0.3 W/mK to about 50 W/mK, about 0.3 W/mK to about 45 W/mK, about 0.3 W/mK to about 40 W/mK, about 0.3 W/mK to about 35 W/m K, about 0.3 W/mK to about 25 W/m K, about 0.3 W/mK to about 20 W/m K, or about 0.3 W/mK to about 15 W/mK. A thermal conductivity of the cured products of the epoxy resin compositions in the article may be, for example, in a range of about 0.35 W/mK to about 40 W/mK, about 0.4 W/mK to about 35 W/mK, about 0.45 W/mK to about 30 W/m K, about 0.50 W/mK to about 20 W/m K, about 0.55 W/mK to about 15 W/m K, or about 0.6 W/mK to about 10 W/mK. When a thermal conductivity of at least one of the cured product, sealing portion, substrate portion, reinforcement portion, or adhesive portion in the article is within these ranges, thermal stability of the article may further be improved.

The article may be, for example, an MP3 player, a navigation system, a portable multimedia player (PMP), a solid state disk (SSD), or a household appliance, but embodiments are not limited thereto.

According to an embodiment, a method of preparing an article includes providing the epoxy resin composition described herein on a substrate; and curing the epoxy resin composition.

The epoxy resin composition may be provided in various state such as a liquid state, a solid state, and a semi-cured state on the substrate. The epoxy resin composition provided in a liquid state may be provided in a molten state or a state dissolved in a solvent. The epoxy resin composition provided in a liquid state may be provided in various shapes such as a powdery shape, a granular shape, or a sheet shape on the substrate. The epoxy resin composition may be provided in a state not cured at all, partially cured, or in a semi-cured state on the substrate. The epoxy resin composition may be molded into a predetermined shape after being provided on the substrate or may be provided on the substrate after being molded into a predetermined shape.

Once the epoxy resin composition is provided on the substrate, the epoxy resin composition may be cured to prepare an article. The cured epoxy resin composition may form a sealing portion, a substrate portion, a reinforcement portion, or an adhesive portion of the article, but embodiments are not limited thereto.

A method of curing the epoxy resin composition may include thermal curing or ultraviolet light curing, but embodiments are not limited thereto. The epoxy resin composition may be cured by heat. A curing temperature of the epoxy resin composition may be about 100° C. or higher, about 110° C. or higher, or about 120° C. or higher. A curing temperature of the epoxy resin composition may be, for example, about 200° C. or lower, about 195° C. or lower, about 190° C. or lower, about 185° C. or lower, or about 180° C. or lower. A curing temperature of the epoxy resin composition may be, for example, in a range of about 100° C. to about 200° C., about 110° C. to about 200° C., about 120° C. to about 200° C., about 130° C. to about 200° C., about 150° C. to about 195° C., about 160° C. to about 190° C., about 150° C. to about 185° C., or about 150° C. to about 180° C. When the epoxy resin composition is cured at a curing temperature within these ranges, damages caused by thermal deformation of a semiconductor or electronic components may be prevented.

Method of Preparing Epoxy Compound

In order to improve thermal conductivity of an epoxy molding compound (EMC), improvement of an epoxy resin itself is important, and the help of a liquid crystal mesogenic unit is useful. However, introduction of a liquid crystal mesogenic unit into an epoxy resin structure may increase a melting point of an epoxy resin and thus may deteriorate processability of an epoxy compound. An alkyl group, which is flexible, may be introduced to lower the melting point of the epoxy resin. However, an epoxy resin compound, to which an alkyl group is introduced, is difficult to be synthesized, and it takes a long period of time for the synthesis. Therefore, a method of preparing an epoxy compound in a simple process and in a short period of time is needed.

According to an embodiment, a method of preparing an epoxy compound includes providing a first composition by contacting a compound represented by Formula 11 with a compound represented by Formula 12; preparing a second composition including a compound represented by Formula 1 from the first composition; and recovering the second composition, wherein the recovering of the second composition is performed while the providing of the first composition is being performed:

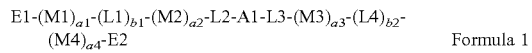

Formula 1

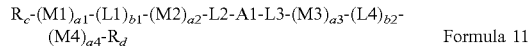

Formula 11

Formula 12 wherein in Formulae 1, 11, and 12,

M1, and M4 are each independently an arylene group represented by Formulae 3a to 3j, M2, and M3 are each independently a naphthalene group represented by Formulae 3g to 3j,

Formula 3a

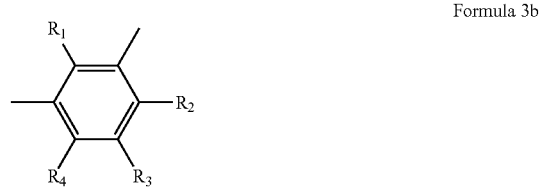

Formula 3b

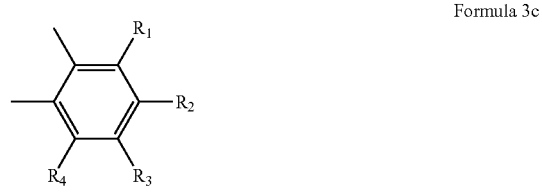

Formula 3c

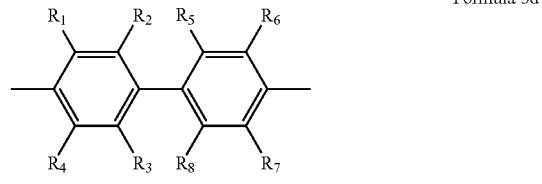

Formula 3d

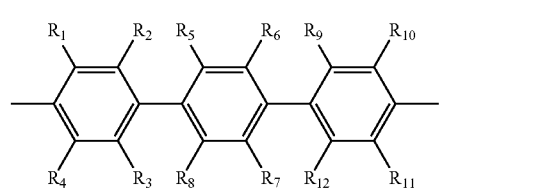

Formula 3e

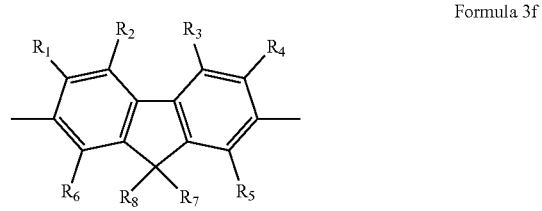

Formula 3f

-continued

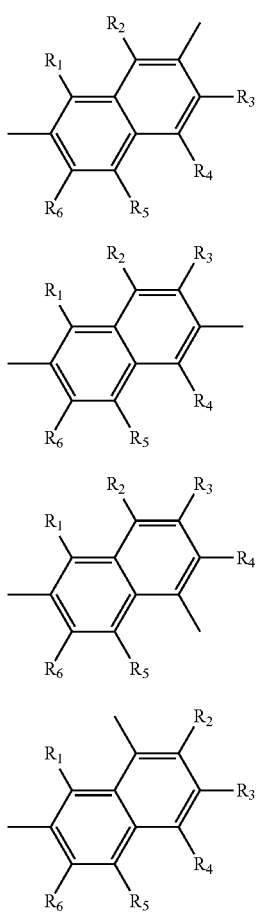

Formula 3g

Formula 3h

Formula 3i

Formula 3j wherein in Formulae 3a to 3j,
$R_1$, $R_2$, $R_3$, $R_4$, $R_5$, $R_6$, $R_7$, $R_8$, $R_9$, $R_{10}$, $R_{11}$, and $R_{12}$ are each independently hydrogen, a halogen, a hydroxy group, or a substituted or unsubstituted C1-C10 alkyl group,
$R_c$ and $R_d$ are each independently a hydroxy group,
$R_e$ is a halogen;
A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;
L1, L2, L3, and L4 are each independently —C(=O)—, —S(=O)—, —C(=O)O—, —OC(=O)—, —S(=O)O—, —OS(=O)—, —O—C(=O)O—, —(CH$_2$)$_2$—C(=O)—, —C(=O)—(CH$_2$)$_2$—, —C(=O)—CH=CH—, —CH=CH—C(=O)—, —CH=N—, —N=CH—, —NH—C(=O)O—, —C(=O)—NH—, or —OC(=O)—NH—S(=O)O—,
E1, E2, and E are each independently an epoxy-containing group,
a1, a4, b1, and b2 each independently 0 or 1, and a2, and a3 are each independently 1 or 2.
In Formula 1 and Formula 11, for example, L1, L2, L3, and L4 are each independently —C(=O)O— or —OC(=O)—.
When an epoxy compound is prepared using this method, an epoxy compound may be prepared at a high yield in a short period of time.

A first composition is provided by contacting a compound represented by Formula 11 with a compound represented by Formula 12.

For example, a compound represented by Formula 11 and a compound represented by Formula 12 may be mixed in a reactor and provide a first composition. For example, the compound represented by Formula 11 and the compound represented by Formula 12 may be individually supplied to the reactor through different inlets. For example, the compound represented by Formula 11 and the compound represented by Formula 12 may each be supplied in a state dissolved in a solvent. Examples of the solvent are not particularly limited, and any suitable solvent capable of dissolving the compound represented by Formula 11 and the compound represented by Formula 12 may be used as the solvent. The solvent may be omitted according to types of the reactants. For example, the compound represented by Formula 11 and the compound represented by Formula 12 may be mixed while continuously moving in the reactor. An example of the compound represented by Formula 12 may be epichlorohydrin.

Also, a second composition including a compound represented by Formula 1 may be prepared from the first composition.

For example, after mixing a compound having an aromatic ring and a compound having an epoxy-containing group in a reactor, the compound including an aromatic ring and represented by Formula 1 may be produced by an acid catalyst or base catalyst reaction. In this regard, a second composition including the compound may be prepared. An acid catalyst or a base catalyst used in the preparing of the second composition may be an organic catalyst instead of a metal catalyst. For example, an acid catalyst or a base catalyst used in the preparing of the second composition may be an organic acid catalyst or an organic base catalyst not including metal ions. The organic base catalyst may be, for example, tetrabutylammonium bromide (TBAB). The acid catalyst or base catalyst may be omitted according to types of the reactants.

The preparing of the second composition may be performed at a temperature of, for example, about 80° C. or higher, about 100° C. or higher, about 120° C. or higher, about 140° C. or higher, about 160° C. or higher, or about 180° C. or higher. The preparing of the second composition may be performed at a temperature, for example, in a range of about 80° C. to about 300° C., about 100° C. to about 290° C., about 120° C. to about 280° C., about 140° C. to about 270° C., about 160° C. to about 260° C., or about 180° C. to about 250° C. In a conventional or available preparation method, performing the reaction at a temperature of about 120° C. or higher was difficult, but the method according to an embodiment allows the reaction to be performed at a temperature of about 120° C. or higher. As the reaction is performed at such a high temperature, the reaction rate may be significantly increased, and thus the reaction time may be significantly reduced as a result.

The preparing of the second composition may be performed at a pressure of, for example, about 1 atmosphere (atm) or higher, about 1.5 atm or higher, about 2.0 atm or higher, about 2.5 atm or higher, about 3.0 atm or higher, about 3.5 atm or higher, about 4.0 atm or higher, about 4.5 atm or higher, or about 5.0 atm or higher. The preparing of the second composition may be performed at a pressure, for example, in a range of about 1 atm to about 20 atm, about 1.5 atm to about 20 atm, about 2.0 atm to about 20 atm, about 2.5 atm to about 20 atm, about 3.0 atm to about 20 atm, about 3.5 atm to about 20 atm, about 4.0 atm to about 20 atm, about 4.5 atm to about 20 atm, or about 5.0 atm to about 20 atm. As the reaction is performed at such a high temperature, the reaction rate may be significantly increased, and thus the reaction time may be significantly reduced as a result.

The preparing of the second composition may be performed, for example, for about 60 minutes or less, about 50 minutes or less, about 40 minutes or less, about 30 minutes or less, about 20 minutes or less, or about 10 minutes or less. The preparing of the second composition may be performed, for example, for about 0.1 minutes to about 60 minutes, about 0.1 minutes to about 50 minutes, about 0.5 minutes to about 40 minutes, about 1 minute to about 30 minutes, about 1 minute to about 20 minutes, or about 1 minute to about 10 minutes.

The first composition and the second composition may not include a precipitate. When the first composition and the second composition do not include a precipitate, clogging of an inlet and/or an outlet of the reactor by the precipitate may be prevented. For example, the first composition and the second composition may both be in a liquid phase.

In an embodiment, the second composition is recovered. A method of recovering the second composition is not particularly limited, and the second composition may be recovered from the reactor through an outlet of the reactor. The outlet of the reactor is distinguished from the inlet of the reactor. For example, the inlet is located in a first direction of the reactor, and the outlet may be located in a second direction. For example, the second direction may be opposite from the first direction. An unreacted material and a solvent may be, for example, removed from the recovered second composition, and a compound represented by Formula 1 may be isolated.

Also, while the providing of the first composition is being performed, the recovering of the second composition may be performed. For example, the second composition represented by Formula 1 may be recovered through the outlet of the reactor while the compound represented by Formula 11 and the compound represented by Formula 12 are being supplied to the reactor through the inlets of the reactor. As the recovering of the second composition is simultaneously performed while the providing of the first composition is being performed, the reaction time may be reduced, and the compound represented by Formula 1 may be obtained at a high yield.

A type of the reactor used in the preparation of the epoxy compound is not particularly limited, and any suitable reactor in which the recovering of the second composition may be performed while the providing of the first composition is being performed may be used as the reactor. The reactor may be, for example, a continuous reactor.

The method of preparing of an epoxy compound may further include preparing the compound represented by Formula 11 by contacting a compound represented by Formula 13 with a base before the providing of the first composition:

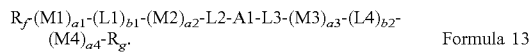

Formula 13

In Formula 13,
M1, and M4 are each independently an arylene group represented by Formulae 3a to 3j,
M2, and M3 are each independently a naphthalene group represented by Formulae 3g to 3j,
A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;
L1, L2, L3, and L4 are each independently —C(=O)O— or —OC(=O)—,
a1, a4, b1, and b2 are each independently 0 or 1, a2, and a3 are each independently 1 or 2, and
$R_f$ and $R_g$ are each independently $R_hC(=O)O—$, wherein $R_h$ is an alkyl group of 1 to 5 carbon atoms. $R_h$ may be, for example, a methyl group. When $R_h$ is a methyl group, the reaction may further be facilitated.

The compound represented by Formula 11 may be prepared by contacting the compound represented by Formula 13 with a base.

For example, the compound represented by Formula 13 and an organic base may each be supplied in a state dissolved in a solvent. The solvent is not particularly limited, and any suitable solvent capable of dissolving the compound represented by Formula 13 and an organic base may be used as the solvent. The solvent may be omitted according to types of the reactants. For example, the compound represented by Formula 13 and an organic base may be mixed while continuously moving in the reactor.

The base used in the preparation of a compound represented by Formula 11 may be, for example, an organic base or an inorganic base. The inorganic base may be, for example, a base including a metal cation. The organic base used in the preparation of a compound represented by Formula 11 may be, for example, a C1 to C10 alkyl amine. The organic base may be, for example, a butyl amine. The inorganic base used in the preparation of the compound represented by Formula 11 may be, for example, NaOH or KOH. The organic base and/or inorganic base may be dissolved in an organic solvent such as ethanol.

The acid catalyst or the base catalyst used in the preparation of the compound represented by Formula 11 may be an organic catalyst instead of a metal catalyst. For example, the acid catalyst or the base catalyst used in the preparation of the compound having an aromatic ring represented by Formula 11 may be an organic acid catalyst or an organic base catalyst not including metal ions. The organic base catalyst may be, for example, a C1 to C10 alkyl amine. The organic base catalyst may be, for example, a butyl amine. The acid catalyst or base catalyst may be omitted according to types of the reactants.

The preparation of the compound represented by Formula 11 may be performed at a temperature of, for example, about 20° C. or higher, about 40° C. or higher, about 60° C., about 80° C. or higher, about 100° C. or higher, about 120° C. or higher, about 140° C. or higher, about 160° C. or higher, or about 180 or higher. The preparation of the compound represented by Formula 11 may be performed at a temperature, for example, in a range of about 20° C. to about 300° C., about 40° C. to about 300° C., about 60° C. to about 300° C., about 80° C. to about 300° C., about 100° C. to about 290° C., about 120° C. to about 280° C., about 140° C. to about 270° C., about 160° C. to about 260° C., or about 180° C. to about 250° C.

The preparation of the compound represented by Formula 11 may be performed at a pressure of, for example, about 1 atm or higher, about 1.5 atm or higher, about 2.0 atm or higher, about 2.5 atm or higher, about 3.0 atm or higher, about 3.5 atm or higher, about 4.0 atm or higher, about 4.5 atm or higher, or about 5.0 atm or higher. The preparation of the compound represented by Formula 11 may be performed at a pressure, for example, in a range of about 1 atm to about 20 atm, about 1.5 atm to about 20 atm, about 2.0 atm to about 20 atm, about 2.5 atm to about 20 atm, about 3.0 atm to about 20 atm, about 3.5 atm to about 20 atm, about 4.0 atm to about 20 atm, about 4.5 atm to about 20 atm, or about 5.0 atm to about 20 atm.

The preparation of the compound represented by Formula 11 may be performed, for example, for about 60 minutes or less, about 50 minutes or less, about 40 minutes or less, about 30 minutes or less, about 20 minutes or less, or about 10 minutes or less. The preparation of the compound represented by Formula 11 may be performed, for example, for about 0.1 minutes to about 60 minutes, about 0.1 minutes to about 50 minutes, about 0.5 minutes to about 40 minutes, about 1 minute to about 30 minutes, about 1 minute to about 20 minutes, or about 1 minute to about 10 minutes.

The method of preparing an epoxy compound may further include preparing a compound represented by Formula 13 by contacting a compound represented by Formula 14 with a compound represented by Formula 15 before the preparing of the compound represented by Formula 11:

  Formula 14

  Formula 15

In Formulae 14 and 15,
M8 is an arylene group represented by Formulae 3a to 3j,
M9 is a naphthalene group represented by Formulae 3g to 3j,
A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;
L9 is —C(=O)O— or —OC(=O)—,
a8 and b5 are each independently 0 or 1, a9 is 1 or 2,
$R_i$ is $R_mC(=O)O$—, wherein $R_m$ is an alkyl group of 1 to 5 carbon atoms, and $R_j$, $R_k$, and $R_l$ are each independently a hydroxy group or a carboxyl group (—COOH).

The compound represented by Formula 14 may be represented by, for example, one of Formulae 14a to 14d, and the compound represented by Formula 15 may be represented by, for example, one of Formulae 15a and 15b:

  Formula 14a

  Formula 14b

  Formula 14c

  Formula 14d

  Formula 15a

  Formula 15b

In Formulae 14a to 14d, 15a, and 15b,
M8 is an arylene group represented by Formulae 3a to 3j,
M9 is a naphthalene group represented by Formulae 3g to 3j,
A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group containing a substituted or unsubstituted C1-C5 alkylene group;

L9 is —C(=O)O— or —OC(=O)—,
a9 is 1 or 2, and
$R_i$ is $R_mC(=O)O$—, wherein $R_m$ is an alkyl group of 1 to 5 carbon atoms.

The compound represented by Formula 13 may be prepared by contacting the compound represented by Formula 14 with the compound represented by Formula 15.

For example, the compound represented by Formula 14 and the compound represented by Formula 15 may each be supplied in a state dissolved in a solvent to the reactor. Examples of the solvent are not particularly limited, and any suitable solvent capable of dissolving the compound represented by Formula 13 and an organic base may be used as the solvent. For example, the solvent may be a mixture solvent of dichloromethane (MC) and dimethylformamide (DMF) or may be dimethylsulfoxide (DMSO). The solvent may be omitted according to types of the reactants. For example, the compound represented by Formula 14 and the compound represented by Formula 15 may be mixed while continuously moving in the reactor.

An acid catalyst or a base catalyst used in the preparation of the compound represented by Formula 13 may be an inorganic catalyst or an organic catalyst. For synthesis by a high-speed continuous reaction or to suppress generation of metal ion impurities, an organic catalyst may be used. For synthesis by a high-speed continuous reaction, a catalyst having improved solubility in a reaction solution may be used. In this case, clogging of the reactor may be prevented in the synthesis by the high-speed continuous reaction flow.

For example, a catalyst used in the preparing of the compound represented by Formula 13 may be an organic acid catalyst or an organic base catalyst not including metal ions. An organic acid and an organic base may be in the form of a salt to improve the solubility. The organic base catalyst may be, for example, a complex of 4-(dimethylamino) pyridine (DMAP) and p-toluenesulfonic acid (PTSA).

In a condensation reaction of preparing the compound represented by Formula 13, a carbodiimide compound, a 1-hydroxy-1,2,3-triazole derivative, a phosphonium-based compound, or a uronium-based compound may be used as a condensing agent. Since the solubility with respect to a reaction solution is improved for the synthesis by a high-speed continuous reaction, a condensing agent capable of suppressing generation of insoluble byproducts in the initial stage and until completion of the reaction and performing the reaction without clogging of the reactor in the middle of the synthesis by the high-speed continuous reaction flow may be used.

The condensing agent capable of suppressing generation of insoluble byproducts may be, for example, N,N'-diisopropylcarbodiimide (DIC) or 1-ethyl-3-(3-dimethylaminopropyl)carbodiimide (EDC). Dicyclohexylcarbodiimide (DCC) produces a large amount of an insoluble compound and thus may interfere the progress of a high-speed continuous reaction.

The 1-hydroxy-1,2,3-triazole derivative may be, for example, 1-hydroxybenzotriazole (HOBT) or 1-hydroxy-7-azabenzotriazole (HOAT).

The phosphonium-based condensing agent may be a compound such as benzotriazol-1-yl-oxytripyrrolidinophosphonium hexafluorophosphate (PyBOP) or 7-azabenzotriazol-1-yloxy)tripyrrolidinophosphonium hexafluorophosphate (PyAOP).

The uronium-based condensing agent may be, for example, hexafluorophosphate benzotriazole tetramethyl uronium (HBTU), hexafluorophosphate azabenzotriazole tetramethyl uronium (HATU), 2-(1H-7-azabenzotriazole-1- yl)-1,1,3,3-tetramethyluronium tetrafluoroborate (TATU), or 2-(1H-benzotriazole-1-yl)-1,1,3,3-tetramethyluronium tetrafluoroborate (TBTU).

The condensing agents may be used alone or as a mixture of at least two.

The preparation of the compound represented by Formula 13 may be performed at a temperature of, for example, about 20° C. or higher, about 40° C. or higher, about 60° C., about 80° C. or higher, about 100° C. or higher, about 120° C. or higher, about 140° C. or higher, about 160° C. or higher, or about 180 or higher. The preparation of the compound represented by Formula 13 may be performed at a temperature, for example, in a range of about 20° C. to about 300° C., about 40° C. to about 300° C., about 60° C. to about 300° C., about 80° C. to about 300° C., about 100° C. to about 290° C., about 120° C. to about 280° C., about 140° C. to about 270° C., about 160° C. to about 260° C., or about 180° C. to about 250° C.

The preparation of the compound represented by Formula 13 may be performed at a pressure of, for example, about 1 atm or higher, about 1.5 atm or higher, about 2.0 atm or higher, about 2.5 atm or higher, about 3.0 atm or higher, about 3.5 atm or higher, about 4.0 atm or higher, about 4.5 atm or higher, or about 5.0 atm or higher. The preparation of the compound represented by Formula 13 may be performed at a pressure, for example, in a range of about 1 atm to about 20 atm, about 1.5 atm to about 20 atm, about 2.0 atm to about 20 atm, about 2.5 atm to about 20 atm, about 3.0 atm to about 20 atm, about 3.5 atm to about 20 atm, about 4.0 atm to about 20 atm, about 4.5 atm to about 20 atm, or about 5.0 atm to about 20 atm.

The preparation of the compound represented by Formula 13 may be performed, for example, for about 60 minutes or less, about 50 minutes or less, about 40 minutes or less, about 30 minutes or less, about 20 minutes or less, or about 10 minutes or less. The preparation of the compound represented by Formula 13 may be performed, for example, for about 0.1 minutes to about 60 minutes, about 0.1 minutes to about 50 minutes, about 0.5 minutes to about 40 minutes, about 1 minute to about 30 minutes, about 1 minute to about 20 minutes, or about 1 minute to about 10 minutes.

In an embodiment, the method of preparing an epoxy compound may include preparing a compound represented by Formula 13 by contacting a compound represented by Formula 14 with a compound represented by Formula 15; preparing a compound represented by Formula 11 by contacting a compound represented by Formula 13 with a base; preparing a first composition by contacting the compound represented by Formula 11 with a compound represented by Formula 12; preparing a second composition including a compound represented by Formula 1 from the first composition; and recovering the second composition, wherein the recovering of the second composition is performed while the preparing of the first composition is being performed. The method of preparing an epoxy compound may increase a reaction rate of a synthesis reaction and perform an isolation and purification process as a continuous process without a separate process of isolation by precipitation in each synthesis step, and thus the synthesis of an epoxy compound may be completed within about 24 hours, about 20 hours, about 16 hours, about 12 hours, about 8 hours, about 4 hours, about 2 hours, or about 1 hour. The reaction may be performed in a microflow reactor.

A conventional or available method of preparing an epoxy compound using a batch-type reactor such as a flask may have a low reaction rate and may include a separate process of isolation by precipitation, which may require, for example, about 80 hours or longer, about 90 hours or longer, about 100 hours or longer, about 110 hours or longer, or about 120 hours or longer to complete synthesis of the epoxy compound.

Hereinafter, definitions of substituents used in the formulae of the present specification are the same as follows.

As used herein, substituents of a substituted alkyl group, a substituted alkylene group, a substituted alkenylene group, a substituted alkynylene group, and a substituted alkadienylene group may be each independently a halogen atom, a hydroxyl group, a C1 to C5 alkyl group, a C1 to C5 alkoxy group, or a combination thereof.

As used herein, the term "alkyl" refers to a fully saturated branched or unbranched (straight chain or linear) hydrocarbon group.

Example of the alkyl group are a methyl group, an ethyl group, an i-propyl group, an isopropyl group, an i-butyl group, an isobutyl group, a sec-butyl group, an i-pentyl group, an isopentyl group, a neopentyl group, an i-hexyl group, a 3-methylhexyl group, a 2,2-dimethylpentyl group, a 2,3-dimethylpentyl group, and an i-heptyl group.

At least one hydrogen atom of the alkyl group may be substituted with a substituent a halogen atom, a hydroxyl group, an alkoxy group, a nitro group, a cyano group, an amino group, an amidino group, a hydrazine, a hydrazone, a carboxyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C5 alkylthio group, a C6-C30 aryloxy group, a C6-C30 arylthio group, a C1 to C20 heteroalkyl group, a C3 to C20 heterocyclo alkyl group, or a combination thereof.

As used herein, the term "alkenyl group" refers to an alkyl group including at least one carbon-carbon double bond.

As used herein, the term "alkynyl group" refers to an alkyl group including at least one carbon-carbon triple bond.

As used herein, the term "alkadienyl group" refers to an alkyl group including two carbon-carbon double bonds.

Examples of "a halogen atom" include fluorine, bromine, chlorine, and iodine.

As used herein, the term "alkoxy" refers to "alkyl-O—," where the alkyl is the same as defined above. Examples of the alkoxy group may include a methoxy group, an ethoxy group, a propoxy group, a 2-propoxy group, a butoxy group, a tert-butoxy group, a pentyloxy group, a hexyloxy group, a cyclopropoxy group, and a cyclohexyloxy group. At least one hydrogen atom in the alkoxy group may be substituted with the same substituent as described above in connection with the alkyl group.

As used herein, the term "alkylthio" refers to "alkyl-S—," where the alkyl is the same as defined above. Examples of the alkylthio group may include a thiomethyl group, a thioethyl group, a thiopropyl group, a 2-thiopropyl group, a thiobutyl group, a thio-tert-butyl group, a thiopentyl group, a thiohexyl group, a thiocyclopropyl group, and a thiocyclohexyl group. At least one hydrogen atom in the alkylthio group may be substituted with the same substituent as described above in connection with the alkyl group.

As used herein, the term "aryl" is used alone or in combination, and refers to an aromatic hydrocarbon group having one or more rings.

The term "aryloxy" used herein refers to aryl-O—, where the aryl is the same as defined above. Non-limiting examples of the aryloxy group may include a phenoxy group, a naphthoxy group, or a tetrahydronaphthyloxy group. At least one hydrogen atom of the "aryloxy" group may be substituted with the same substituent as described above in connection with the alkyl group.

The "arylthio" used herein refers to aryl-S—, where the aryl is the same as defined above. Non-limiting examples of the arylthio group may include a thiophenyl group, a thionaphthyl group, or a thiotetrahydronaphthyl group. At least one hydrogen atom of the "arylthio" group may be substituted with the same substituent as described above in connection with the alkyl group.

Also, as used herein, when a definition is not otherwise provided, 'hetero' may refer to one including 1 to 4 heteroatoms I, O, S, Se, Te, Si, or P.

The term "aryl" also refers to a group in which an aromatic ring is fused to one or more cycloalkyl rings. Examples of the aryl group may include a phenyl group, a naphthyl group, or a tetrahydronaphthyl group. At least one hydrogen atom of the aryl group may be substituted with the same substituent as described above in connection with the alkyl group.

As used herein, the term "heteroaryl" refers to an aryl group, in which at least one carbon atom or CH or $CH_2$ is substituted with a heteroatom or a chemical group containing at least one heteroatom.

As used herein, the term "alkylene group" refers to a bivalent aromatic hydrocarbon group corresponding to an "alkyl" group.

As used herein, the term "alkylene group" refers to a bivalent hydrocarbon group corresponding to an "alkyl" group.

As used herein, the term "alkenylene group" refers to a bivalent hydrocarbon group corresponding to an "alkenyl" group.

As used herein, the term "alkynylene group" refers to a bivalent hydrocarbon group corresponding to an "alkynyl" group.

As used herein, the term "alkadienylene group" refers to a bivalent hydrocarbon group corresponding to an "alkadienyl" group.

As used herein, the term "arylene group" refers to a bivalent aromatic hydrocarbon group corresponding to an "aryl" group.

As used herein, the term "heteroarylene group" refers to a bivalent aryl group in which at least one carbon atom or CH or $CH_2$ is substituted with a heteroatom or a chemical group containing at least one heteroatom.

As used herein, the open ended "—" refers to a bond or a methyl group, for example, in the following structures "—" without any R substituent refers to a bond or a methyl group. For example,

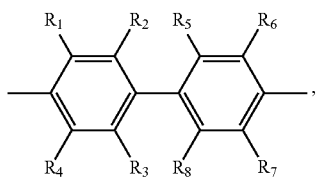

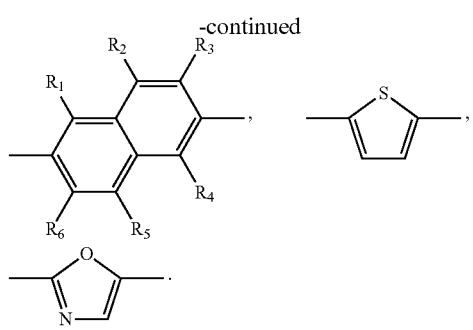

The term "room temperature" used herein refers to a temperature of about 25° C.

One or more embodiments will now be described in more detail with reference to the following examples. However, these examples are not intended to limit the scope of the one or more embodiments. The wording "'B' was used instead of 'A'" used in describing Synthesis Examples means that an amount of 'A' used was identical to an amount of 'B' used, in terms of a molar equivalent.

EXAMPLES

Preparation of Epoxy Compound and Cured Product

Example 1

Preparation of Epoxy Compound

A solution prepared by completely dissolving 5 gram (g) (0.022 mole (mol)) of 6-acetoxy-2-naphthoic acid

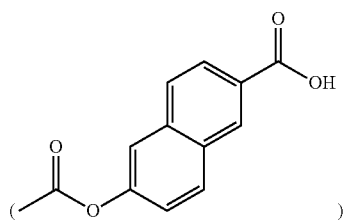 [SMILES: CC(=O)Oc1ccc2cc(C(=O)O)ccc2c1]

and 0.35 g (0.0012 mol) of an organic salt catalyst (4-(dimethylamino)pyridinium 4-toluenesulfonate) formed of a complex of DMAP/PTSA (4-dimethylaminopyridine/p-toluene sulfonic acid) in 35 milliliter (ml) of a mixture solvent including methylene chloride (MC) and dimethylformamide (DMF) at a volume ratio of 60:40 was added to a micro reactor having a diameter of 1 millimeter (mm) through a first inlet, and a mixture solution prepared by dissolving 1.30 g (0.011 mol) of 1,6-hexanediol, 1.52 g (0.024 mol) of N,N'-diisopropylcarbodiimide (DIC), and 3.27 g (0.024 mol) of 1-hydroxy-7-azabenzotriazole (HOAt) in 35 ml of a mixture solvent of MC and DMF at a volume ratio of 60:40 was simultaneously added to the reactor through a second inlet.

The solutions were mixed in the reactor and reacted, and thus

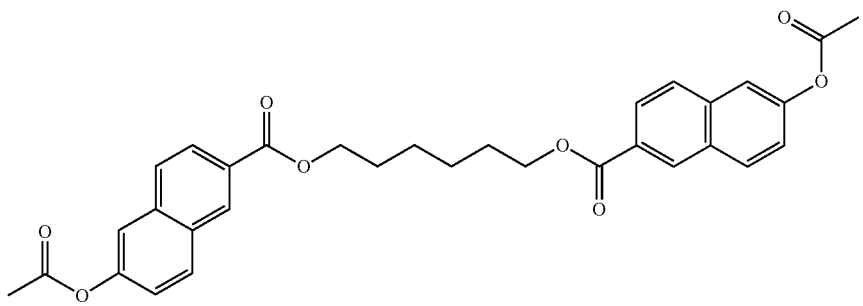 [SMILES: CC(=O)Oc1ccc2cc(C(=O)OCCCCCCOC(=O)c3ccc4cc(OC(C)=O)ccc4c3)ccc2c1]

was produced as a result.

The temperature inside the reactor was about 25° C., and the reaction time was about 1 hour. The production of the reaction was monitored by the newly generated peak at 1722 $cm^{-1}$ by the In-line FT-IR.

In the reactor having the produced

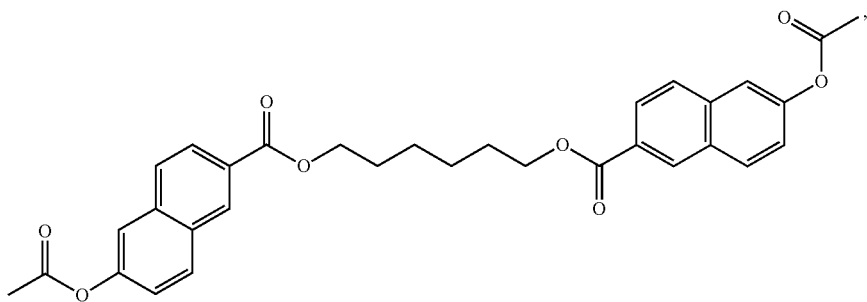 [SMILES: CC(=O)Oc1ccc2cc(C(=O)OCCCCCCOC(=O)c3ccc4cc(OC(C)=O)ccc4c3)ccc2c1]

20 ml of ethanol (EtOH) solution, in which 1.28 g (0.024 mol) of potassium hydroxide (KOH) was dissolved, was continuously added through a third inlet.

In the reactor, the solutions were mixed and reacted, and thus

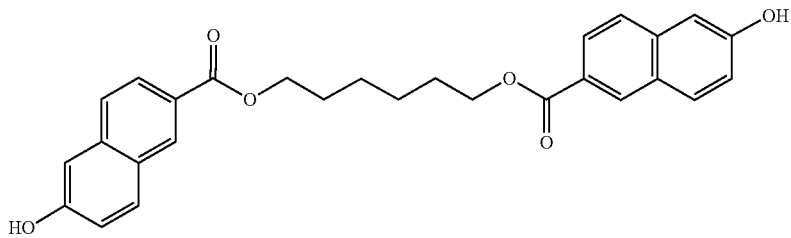 [SMILES: O=C(OCCCCCCOC(=O)c1ccc2cc(O)ccc2c1)c1ccc2cc(O)ccc2c1]

was produced as a result.

The temperature inside the reactor was about 50° C., and the reaction time was about 1 hour. The progression of the reaction was monitored by the peak reduction at 1050 $cm^{-1}$ by the In-line FT-IR.

A HCl aqueous solution was added to the reactor including

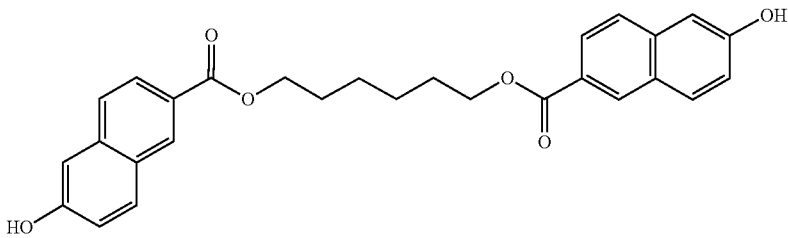 [SMILES: O=C(OCCCCCCOC(=O)c1ccc2cc(O)ccc2c1)c1ccc2cc(O)ccc2c1]

through a fourth inlet to extract residual KOH, and a water (H₂O) layer was removed using a liquid-water separator.

30 ml of methylethylketone (MEK), in which 0.135 g (0.4 millimole (mmol)) of tetrabutyl ammonium bromide (TBAB) and 19.5 g (0.21 mol) of epichlorohydrin (ECH) were dissolved, was continuously added to the residual solution through a fifth inlet.

The solutions were mixed and reacted in the reactor, and a compound represented by Formula 9a was produced as a result. The temperature inside the reactor was about 120° C., and the reaction time was about 10 minutes.

While the compounds described above were continuously added to the reactor through the first, second, and third inlets of the reactor, a composition including the compound represented by Formula 9a was continuously recovered through a first outlet of the reactor.

The solvent and unreacted materials were isolated and purified from the recovered composition, and thus a compound represented by Formula 9a was obtained.

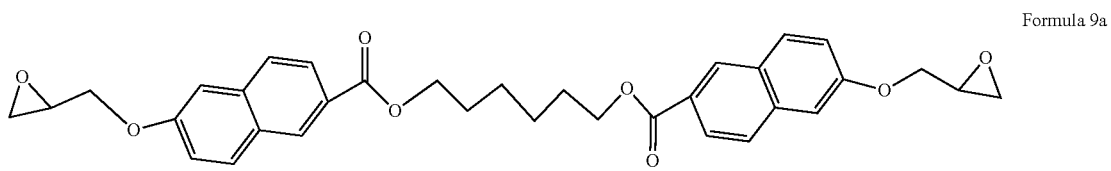 [SMILES: O=C(OCCCCCCOC(=O)c1ccc2cc(OCC3CO3)ccc2c1)c1ccc2cc(OCC3CO3)ccc2c1]

Formula 9a

A molecular weight (m/z=571.23) of the compound was confirmed by a liquid chromatography mass spectrometry (LC-MS).

A molecular structure of the compound represented by Formula 9a was confirmed by proton nuclear magnetic resonance ($^1$H-NMR). $^1$H NMR (DMSO-d6, δ ppm): 1.50 (2H), 1.77 (2H), 2.75 (1H), 2.83 (1H), 3.41 (1H), 4.0 (1H) 4.31 (2H), 4.5 (1H) 7.30 (1H), 7.45 (1H), 7.80 (1H), 7.92 (1H), 8.04 (1H), 8.52 (1H).

A melting point of the compound represented by Formula 9a measured by a dynamic scanning calorimetry (DSC) was about 171° C.

Figure 6:
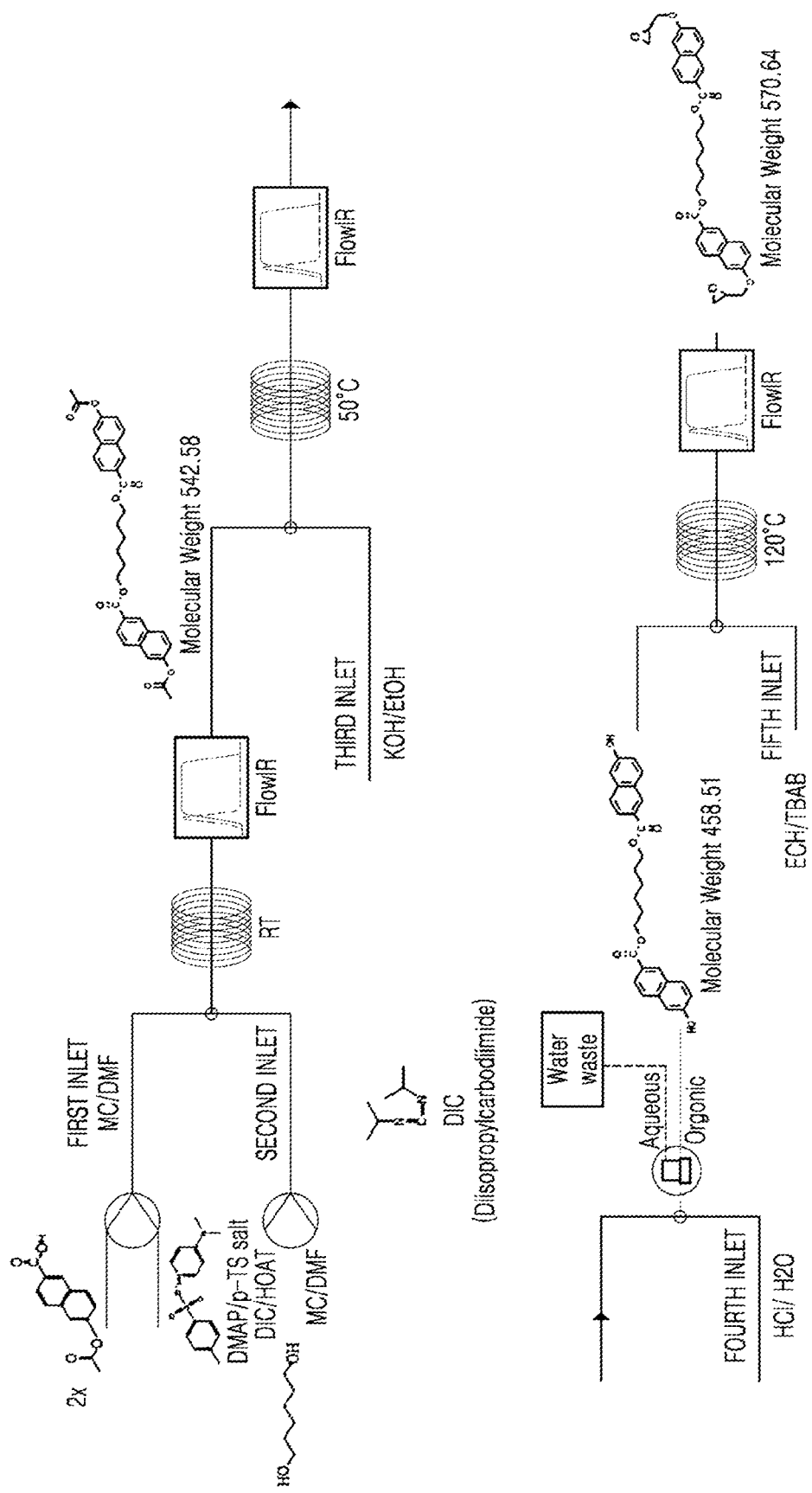
FIG. 6 is a flowchart of an exemplary reaction of Example 1.

The reaction may be represented by, for example, the flowchart shown in FIG. 6.

Preparation of Cured Product

The prepared epoxy compound represented by Formula 9a and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 2

Preparation of Epoxy Compound

An epoxy compound represented by Formula 9b was synthesized in the same manner as in Example 1 under the same conditions, except that 1.15 g (0.011 mol) of 1,5-pentanediol was used instead of hexanediol.

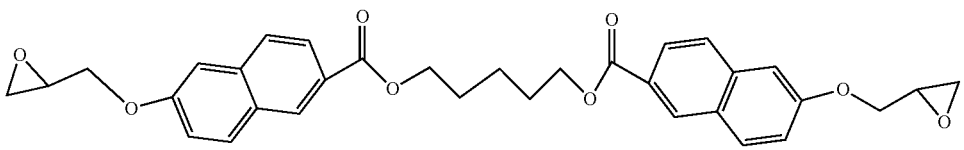

Formula 9b

A molecular weight (m/z=557.22) of the compound was confirmed by LC-MS.

A molecular structure of the compound represented by Formula 9b was confirmed by $^1$H-NMR. $^1$H NMR (DMSO-d6, δ ppm): 1.61 (1H), 1.77 (2H), 2.77 (1H), 2.85 (1H), 3.41 (1H), 4.0 (1H) 4.31 (2H), 4.5 (1H) 7.25 (1H), 7.38 (1H), 7.80 (1H), 7.92 (1H), 7.98 (1H), 8.52 (1H).

A melting point of the compound represented by Formula 9b measured by DSC was about 96° C.

Preparation of Cured Product

The prepared epoxy compound represented by Formula 9b and a phenol-based curing agent, MEH7500 (a multi-functional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 3

Preparation of Epoxy Compound

An epoxy compound represented by Formula 9c was synthesized in the same manner as in Example 1 under the same conditions, except that 0.99 g (0.011 mol) of 1,4-butanediol was used instead of hexanediol.

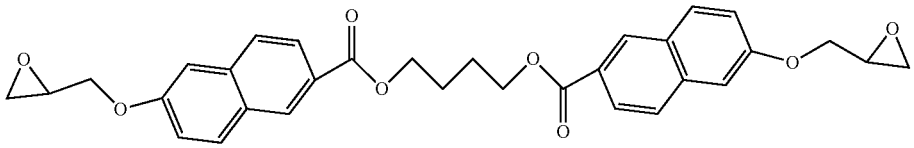

Formula 9c

A molecular weight (m/z=543.20) of the compound represented by Formula 9c was confirmed by LC-MS.

A molecular structure of the compound represented by Formula 9c was confirmed by $^1$H-NMR. $^1$H NMR (DMSO-d6, δ ppm): 1.95 (2H), 2.78 (1H), 2.90 (1H), 3.43 (1H), 4.0 (1H) 4.43 (2H), 4.5 (1H), 7.29 (1H), 7.43 (1H), 7.87 (1H), 7.95 (1H), 8.05 (1H), 8.56 (1H).

A melting point of the compound represented by Formula 9c measured by DSC was about 126° C.

Preparation of Cured Product

The prepared epoxy compound represented by Formula 9c and a phenol-based curing agent, MEH7500 (a multi-functional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 4

Preparation of Epoxy Compound

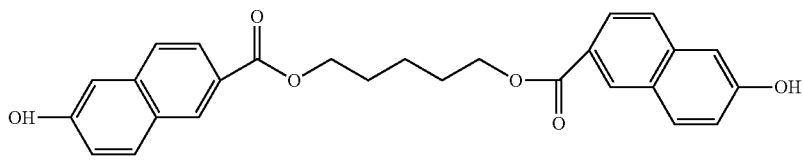 [SMILES: O=C(OCCCCCOC(=O)c1ccc2cc(O)ccc2c1)c1ccc2cc(O)ccc2c1]

completely dissolved in 70 ml of a mixture solvent including MC and DMF at a volume ratio of 60:40 was synthesized in the same manner as in Example 2, except that 1.15 g (0.011 mol) of 1,5-pentanediol was used instead of hexanediol.

1.52 g (0.024 mol) of N,N'-diisopropylcarbodiimide (DIC), 3.27 g (0.024 mol) of 1-hydroxy-7-azabenzotriazole, and 3.96 g (0.022 mol) of acetoxybenzoic acid completely dissolved in a mixture of MC and DMF at a volume ratio of 60:40 and 0.35 g (0.0012 mol) of an organic salt catalyst formed of a complex of DMAP/PTSA were added to a micro reactor having a diameter of 1 mm through a fifth inlet, and these were reacted to produce

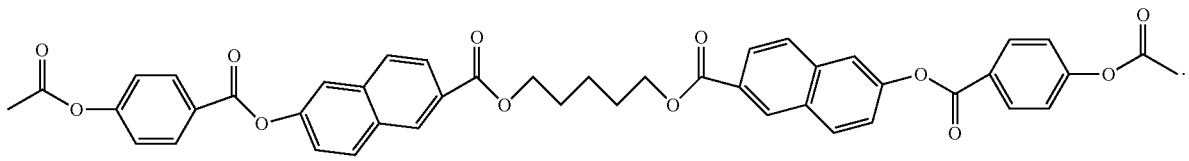 [SMILES: CC(=O)Oc1ccc(C(=O)Oc2ccc3cc(C(=O)OCCCCCOC(=O)c4ccc5cc(OC(=O)c6ccc(OC(C)=O)cc6)ccc5c4)ccc3c2)cc1]

The temperature inside the reactor was about 25° C., and the reaction time was about 1 hour.

In the reactor having the produced

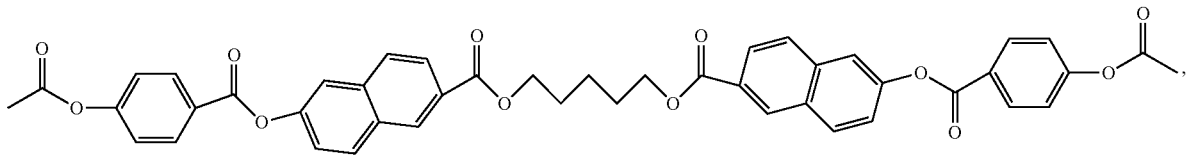 [SMILES: CC(=O)Oc1ccc(C(=O)Oc2ccc3cc(C(=O)OCCCCCOC(=O)c4ccc5cc(OC(=O)c6ccc(OC(C)=O)cc6)ccc5c4)ccc3c2)cc1]

20 ml of EtOH solution, in which 1.28 g (0.024 mol) of KOH was dissolved, was continuously added through a sixth inlet.

In the reactor, the solutions were mixed and reacted, and thus

was produced as a result. The temperature inside the reactor was about 25° C., and the reaction time was about 2 hours.

A HCl aqueous solution was added to the reactor including

through a seventh inlet to extract residual KOH, and a water (H$_2$O) layer was removed using a liquid-water separator.

19.5 g (0.21 mol) epichlorohydrin (ECH) dissolved in 0.135 g (0.4 mmol) of tetrabutyl ammonium bromide (TBAB) was continuously added to the reactor through an eighth inlet.

The solutions were mixed and reacted in the reactor, and a compound represented by Formula 9f was produced as a result. The temperature inside the reactor was about 110° C., and the reaction time was about 30 minutes.

The solvent and unreacted materials were separated and purified from the recovered composition, and thus a compound represented by Formula 9f was obtained.

Formula 9f

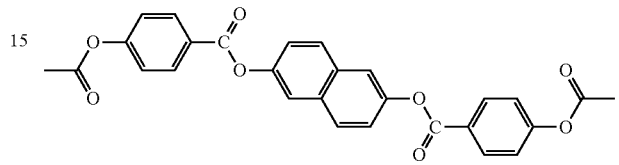

A molecular weight (m/z=797.42) of the compound represented by Formula 9f was confirmed by LC-MS.

A molecular structure of the compound represented by Formula 9f was confirmed by $^1$H-NMR. $^1$H NMR (DMSO-d6, δ ppm): 1.61 (1H), 1.77 (2H), 2.77 (1H), 2.85 (1H), 3.41 (1H), 4.0 (1H) 4.31 (2H), 4.5 (1H) 7.25 (1H), 7.38 (1H), 7.80 (1H), 7.85 (2H), 7.92 (1H), 7.98 (1H), 8.06 (2H), 8.52 (1H).

A melting point of the compound represented by Formula 9f measured by DSC was about 72.6° C.

Preparation of Cured Product

The prepared epoxy compound represented by Formula 9f and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 5

Preparation of Epoxy Compound 11.71 g of 4-acetoxybenzoic acid completely dissolved in 90 ml of a mixture solvent including MC and DMF at a volume ratio of 80:20 and 1 g (0.0034 mol) of an organic salt catalyst formed of a complex of DMAP/PTSA were added to a micro reactor having a diameter of 1 mm through a first inlet, and a mixture solution prepared by dissolving 5 g (0.031 mol) of 2,6-dihydroxynaphthalene, 6.3 g (0.1 mol) of N,N'-diisopropylcarbodiimide (DIC), and 6.81 g (0.05 mol) of 1-hydroxy-7-azabenzotriazole (HOAt) in 90 ml of a mixture of MC and DMF at a volume ratio of 80:20 was simultaneously added to the reactor through a second inlet.

The solutions were mixed in the reactor and reacted, and thus

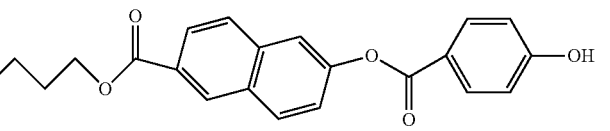

was produced as a result. The temperature inside the reactor was about 25° C., and the reaction time was about 1 hour.

In the reactor having the produced

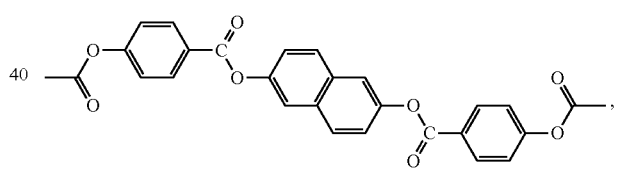

50 ml of EtOH solution, in which 3.65 g (0.065 mol) of KOH was dissolved, was continuously added through a third inlet.

In the reactor, the solutions were mixed and reacted, and thus

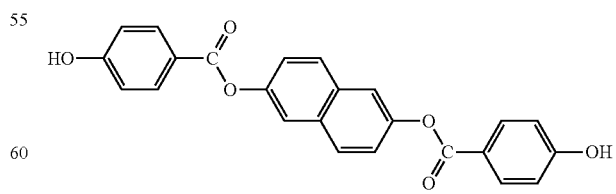

was produced as a result. The temperature inside the reactor was about 50° C., and the reaction time was about 1 hour.

A HCl aqueous solution was added to the reactor including

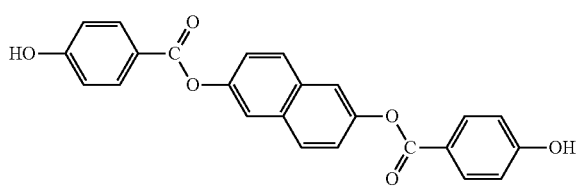 [SMILES: O=C(Oc1ccc2cc(OC(=O)c3ccc(O)cc3)ccc2c1)c1ccc(O)cc1]

through a fourth inlet to extract residual KOH, and a water (H$_2$O) layer was removed using a liquid-water separator.

1 g (0.0034 mol) of an organic salt catalyst formed of a complex of DMAP/PTSA was added to a micro reactor having a diameter of 1 mm through a fifth inlet, and a mixture solution prepared by dissolving 7.42 g (0.065 mol) of 5-hexenoic acid, 6.3 g (0.1 mol) of N,N'-diisopropylcarbodiimide (DIC), and 6.54 g (0.048 mol) of 1-hydroxy-7-azabenzotriazole in 90 ml of a mixture including MC and DMF at a volume ratio of 80:20 was simultaneously added to the reactor through a sixth inlet.

In the reactor, the solutions were mixed and reacted, and thus was recovered into a flask, the solvent was removed by vacuum distillation, the product was precipitated in methanol, and the precipitate was separated and dried.

7.4 g (0.0125 mol) of the dried product compound was added to a 250 ml flask and dissolved in 70 ml of methylene chloride (MC), and 7.3 g (0.042 mol) of m-chloroperoxybenzoic acid (MCPBA), 15 g (0.128 mol) of N-methylmorpholine N-oxide (NMO), and 0.565 g (0.001 mol) of a Mn Salen complex of the formula

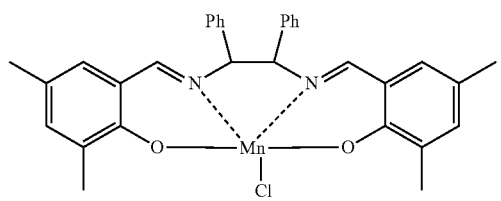

were added and allowed to react at room temperature for 1 hour.

The precipitate produced after completion of the reaction was removed by a filter, the solvent and unreacted materials were isolated and purified from the recovered composition, and thus a compound represented by Formula 10b was obtained.

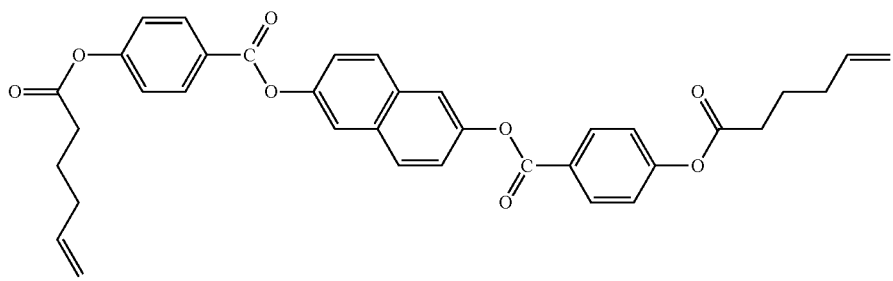 [SMILES: C=CCCCC(=O)Oc1ccc(C(=O)Oc2ccc3cc(OC(=O)c4ccc(OC(=O)CCCC=C)cc4)ccc3c2)cc1]

was produced as a result. The temperature inside the reactor was about 25° C., and the reaction time was about 1 hour.

A composition including the compound

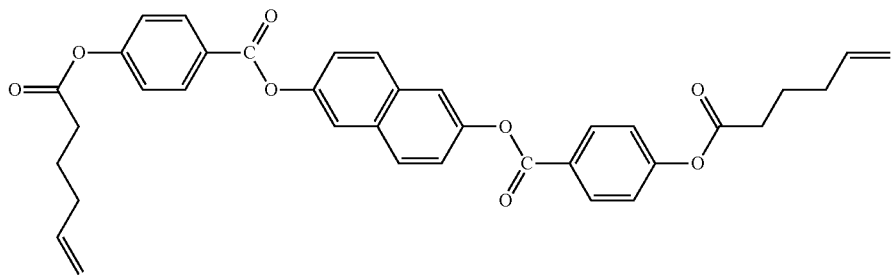 [SMILES: C=CCCCC(=O)Oc1ccc(C(=O)Oc2ccc3cc(OC(=O)c4ccc(OC(=O)CCCC=C)cc4)ccc3c2)cc1]

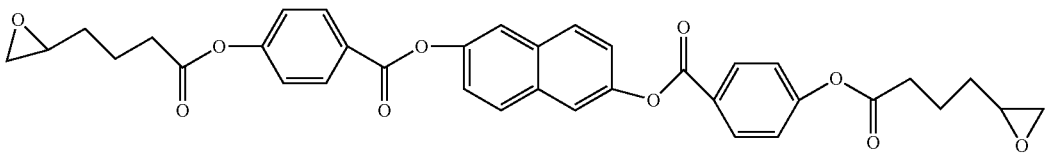

Formula 10b

A molecular weight (m/z=625.2) of the compound represented by Formula 10b was confirmed by LC-MS.

A molecular structure of the compound represented by Formula 10b was confirmed by 1H-NMR. 1H NMR (DMSO-d6, δ ppm): 1.50 (1H), 1.62 (1H), 1.77 (2H), 2.44 (1H), 2.70 (3H), 2.91 (1H), 7.35 (2H), 7.51 (1H), 7.89 (1H), 8.02 (1H), 8.21 (2H).

A melting point of the compound represented by Formula 10b measured by DSC was about 138° C.

Preparation of Cured Product

The prepared epoxy compound represented by Formula 10b and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 6

Preparation of Epoxy Compound

An epoxy compound represented by Formula 10f was synthesized in the same manner as in Example 5 under the same conditions, except that 5 g (0.031 mol) of 2,7-dihydroxynaphthalene was used instead of 5 g (0.031 mol) of 2,6-dihydroxynaphthalene.

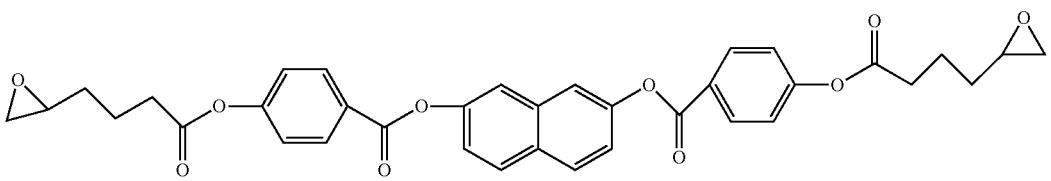

Formula 10f

A molecular weight (m/z=625.2) of the compound represented by Formula 10f was confirmed by LC-MS.

A molecular structure of the compound represented by Formula 10f was confirmed by $^1$H-NMR. $^1$H NMR (DMSO-d6, δ ppm): 1.50 (1H), 1.62 (1H), 1.77 (2H), 2.44 (1H), 2.70 (3H), 2.91 (1H), 7.40 (2H), 7.51 (1H), 7.89 (1H), 8.11 (1H), 8.25 (2H).

A melting point of the compound represented by Formula 10f measured by DSC was about 129° C.

Preparation of Cured Product

The prepared epoxy compound represented by Formula 10f and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 7

Preparation of Epoxy Compound

An epoxy compound represented by Formula 10a was synthesized in the same manner as in Example 5 under the same conditions, except that 6.54 g (0.065 mol) of 4-pentenoic acid was used instead of 7.42 g (0.065 mol) of 5-hexenoic acid.

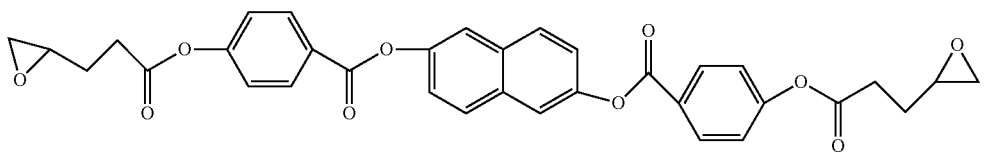

Formula 10a

A molecular weight (m/z=597.17) of the compound represented by Formula 10a was confirmed by LC-MS.

A molecular structure of the compound represented by Formula 10a was confirmed by $^1$H-NMR. $^1$H NMR (DMSO-d6, δ ppm): 1.78 (1H), 1.94 (1H), 2.45 (1H), 2.70 (3H), 2.91 (1H), 7.38 (2H), 7.51 (1H), 7.89 (1H), 8.01 (1H), 8.21 (2H).

A melting point of the compound represented by Formula 10a measured by DSC was about 183° C.

Preparation of Cured Product

The prepared epoxy compound represented by Formula 10a and a phenol-based curing agent, MEH7500 (a multi-functional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Example 8

Preparation of Epoxy Compound

In a 3-neck glass flask of 250 ml, 5 g (0.022 mol) of 4-acetoxy naphthoic acid ( 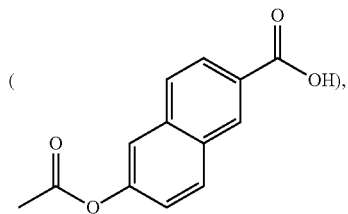 OH), 0.37 g (0.003 mol) of a DMAP catalyst, and 1.30 g (0.011 mol) of 1,6-hexanediol were completely dissolved in 70 ml of methylene chloride (MC), and 1.52 g (0.024 mol) of N,N'-diisopropylcarbodiimide (DIC) was added dropwise over 5 minutes.

In the reactor, the solutions were mixed and reacted, and thus

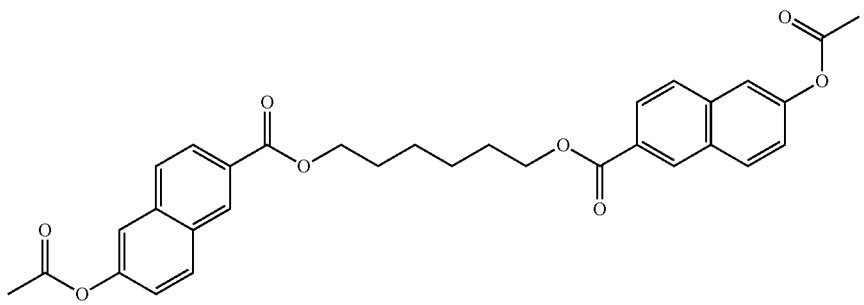 [SMILES: CC(=O)Oc1ccc2cc(C(=O)OCCCCCCOC(=O)c3ccc4cc(OC(C)=O)ccc4c3)ccc2c1]

was produced as a result. The temperature inside the reactor was about 25° C., and the appropriate reaction time was about 16 hours.

MC in the reactor in which

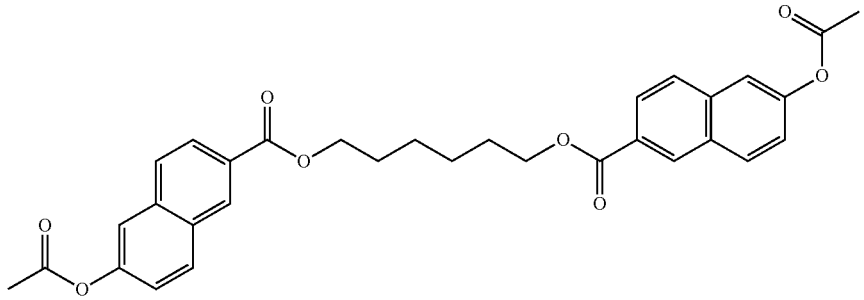 [SMILES: CC(=O)Oc1ccc2cc(C(=O)OCCCCCCOC(=O)c3ccc4cc(OC(C)=O)ccc4c3)ccc2c1]

was produced was removed using a rotary vacuum distiller, and the resultant was dried for 16 hours.

After the drying process, the resultant was dissolved in 50 ml of a solvent including toluene and THF at a volume ratio of 50:50 in a flask of 100 ml, and 20 ml of an ethanol (EtOH) solution, in which 1.28 g (0.024 mol) of KOH was dissolved, was added thereto. Thus, the solutions were mixed and reacted, and thus

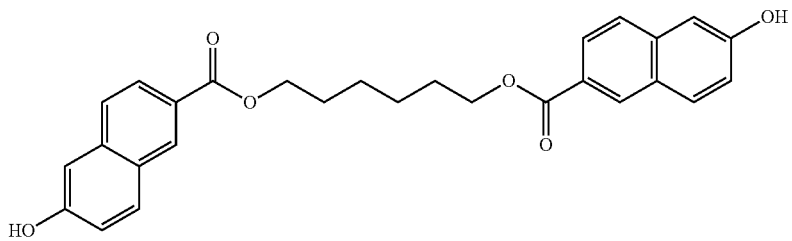 [SMILES: O=C(OCCCCCCOC(=O)c1ccc2cc(O)ccc2c1)c1ccc2cc(O)ccc2c1]

(MW=458.1) was produced as a result. The temperature inside the reactor was about 50° C., and the reaction time was about 2 hours.

A HCl aqueous solution was added to the reactor including

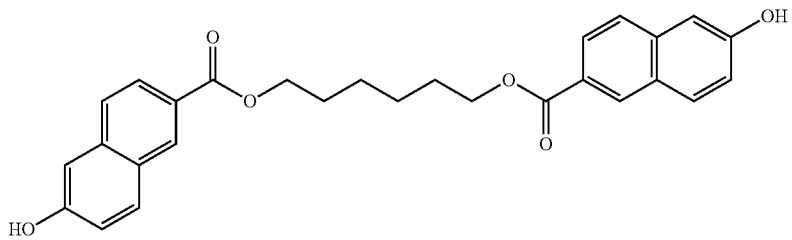 [SMILES: O=C(OCCCCCCOC(=O)c1ccc2cc(O)ccc2c1)c1ccc2cc(O)ccc2c1]

through a fourth inlet to extract residual KOH, and a water ($H_2O$) layer was removed using a liquid-water separator.

The solvent in the residual solution was removed using a rotary vacuum distiller, the product was precipitated in methanol, and the precipitate was separated using a filter and vacuum dried at 60° C. for 16 hours.

The dried product was added to 30 ml of methylethylketone (MEK), in which 0.135 g (0.4 mmol) of tetrabutyl ammonium bromide (TBAB) and 19.5 g (0.21 mol) of epichlorohydrin (ECH) were dissolved, in a 3-neck flask of 250 ml to be reacted. The temperature inside the reactor was about 80° C., and the reaction time was about 6 hours.

When the reaction temperature was higher than 80° C., byproducts such as dimers were generated in excess.

The solvent and unreacted materials were isolated and purified from the recovered composition, and thus a compound represented by Formula 9a was obtained.

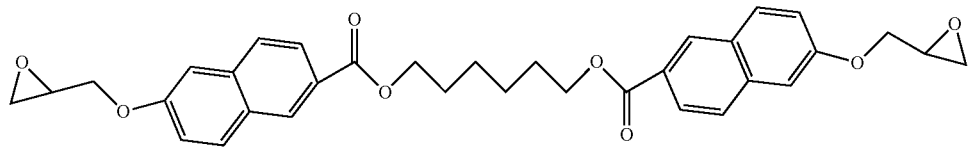

Formula 9a

A molecular weight (m/z=571.23) of the compound represented by Formula 9a was confirmed by LC-MS.

A molecular structure of the compound represented by Formula 9a was confirmed by $^1$H-NMR. $^1$H NMR (DMSO-d6, δ ppm): 1.50 (2H), 1.77 (2H), 2.75 (1H), 2.83 (1H), 3.41 (1H), 4.0 (1H) 4.31 (2H), 4.5 (1H) 7.30 (1H), 7.45 (1H), 7.80 (1H), 7.92 (1H), 8.04 (1H), 8.52 (1H).

A melting point of the compound represented by Formula 9a measured by DSC was about 171° C.

Comparative Example 1

Preparation of Epoxy Compound

An epoxy compound represented by Formula A was synthesized in the same manner as in Example 1 under the same conditions, except that 3.91 g (0.022 mol) of 4-acetoxybenzoicacid was used instead of 6-acetoxy-2-naphthoic acid.

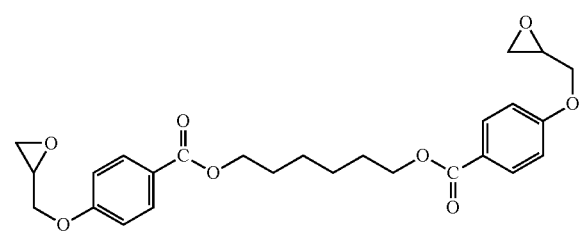

Formula A

A molecular weight (m/z=471.23) of the compound represented by Formula A was confirmed by LC-MS.

A molecular structure of the compound represented by Formula A was confirmed by $^1$H-NMR. $^1$H NMR (DMSO-d6, δ ppm): 1.45 (2H), 1.78 (2H), 2.75 (1H), 2.83 (1H), 3.41 (1H), 4.0 (1H) 4.31 (2H), 4.5 (1H) 7.03 (2H), 7.92 (2H).

A melting point of the compound represented by Formula A was not measured by DSC.

Preparation of Cured Product

The prepared epoxy compound represented by Formula A and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Comparative Example 2

Preparation of Epoxy Compound

An epoxy compound represented by Formula B was synthesized in the same manner as in Example 1 under the same conditions, except that 5.64 g (0.022 mol) of 4'-acetoxy-biphenyl-4-carboxylic acid was used instead of 6-acetoxy-2-naphthoic acid and 0.99 g (0.011 mol) of 1,4-butanediol was used instead of hexanediol.

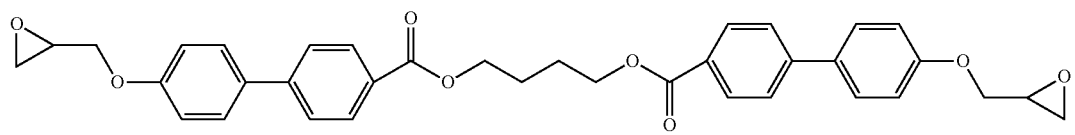

Formula B

A molecular weight (m/z=595.23) of the compound represented by Formula B was confirmed by LC-MS.

A molecular structure of the compound represented by Formula B was confirmed by $^1$H-NMR. $^1$H NMR (DMSO-d6, δ ppm): 1.98 (2H), 2.79 (1H), 2.93 (1H), 3.40 (1H), 4.0 (1H) 4.30 (1H), 4.44 (2H) 7.01 (2H), 7.55 (2H), 7.62 (2H), 8.08 (2H).

A melting point of the compound represented by Formula B measured by DSC was about 212° C.

Preparation of Cured Product

The prepared epoxy compound represented by Formula B and a phenol-based curing agent, MEH7500 (a multifunctional phenol available from Meiwa Plastic Industries, LTD), were mixed at an equivalent ratio of 1:1 to prepare an epoxy resin composition.

5 g of the prepared epoxy resin composition was added to an aluminum mold and cured by heating the mold to 190° C. to prepare a cured product of the epoxy resin composition as a sample.

Evaluation Example 1: Measurement of Reaction Time

The time and yield required to prepare the epoxy compounds of Examples 1 to 8 were measured. The results of the measurement are shown in Table 1.

The time required for the preparation evaluated as the time required to prepare the epoxy compounds of the same amount (for example, the same number of moles) from the time the reactant was added.

TABLE 1

|  | Reaction time [Minute] | Synthesis yield [%] |
|---|---|---|
| Example 1 | Less than 6 hours | 42% |
| Example 2 | Less than 6 hours | 38% |
| Example 3 | Less than 6 hours | 45% |
| Example 4 | Less than 9 hours | 33% |
| Example 5 | Less than 8 hours | 40% |
| Example 6 | Less than 8 hours | 38% |
| Example 7 | Less than 8 hours | 35% |
| Example 8 | 4 days | 45% |

As shown in Table 1, the time required to prepare the epoxy compound in the continuous reactor of Examples 1 to 7 was reduced to about 25% or less of the time required to prepare the epoxy compound in the batch reactor of Example 8.

Evaluation Example 2: Measurement of Thermal Conductivity and Melting Point

The thermal conductivities of samples, which are the cured products of the epoxy resin compositions including the epoxy compounds and a curing agent prepared in Examples 1 to 5 and Comparative Examples 1 to 4, were measured. The results of the measurement are shown in Table 2.

Melting points of the epoxy compounds prepared in Examples 1 to 5 and Comparative Examples 1 to 4 were measured.

The thermal conductivities were evaluated by a modified transient plane source (MTPS) technique using a C-THERM TCI™ thermal conductivity analyzer.

A DSC peak temperature measured in a dynamic scanning calorimeter (DSC) by increasing a temperature at a rate of 10 degrees per minute was used as the melting temperature. The DSC peak temperature was the melting temperature of the epoxy compound.

TABLE 2

|  | Thermal conductivity [W/mk] |
|---|---|
| Example 1 | 0.34 |
| Example 2 | 0.33 |
| Example 3 | 0.34 |
| Example 4 | 0.30 |
| Example 5 | 0.30 |
| Example 6 | 0.31 |
| Example 7 | 0.31 |
| Comparative Example 1 | 0.21 |
| Comparative Example 2 | 0.34 |

As shown in Table 2, the cured products obtained from the epoxy compounds of Examples 1 to 7 had improved thermal conductivities as compared with that of the cured product obtained from the epoxy compound of Comparative Example 1.

Also, melting temperatures of the epoxy compounds of Examples 1 to 7 were all about 200° C. or lower. On the other hand, a melting temperature of the epoxy compound of Comparative Example 2 was about 212° C., which was inappropriate for an epoxy molding condition.

According to an aspect of an embodiment, when an epoxy resin composition includes an epoxy compound having an aromatic ring, thermal conductivity of a cured product of the epoxy resin composition is improved, thermal stability of a semiconductor device, an electronic device, and an article including the cured product may be improved, and a time for synthesizing an epoxy compound having an aromatic ring may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present detailed description as defined by the following claims.

What is claimed is:
1. An epoxy compound including an aromatic ring represented by one of Formulae 4a to 4f:

E1-M2-L2-A1-L3-M3-E2    Formula 4a

E1-M1-L1-M2-L2-A1-L3-M3-E2    Formula 4b

E1-M2-L2-A1-L3-M3-L4-M4-E2    Formula 4c

E1-M1-L1-M2-L2-A1-L3-M3-L4-M4-E2    Formula 4d

E1-M1-M2-L2-A1-L3-M3-L4-M4-E2    Formula 4e

E1-M1-L1-M2-L2-A1-L3-M3-M4-E2    Formula 4f wherein, in Formulae 4a to 4f,
M1 and M4 are each independently an arylene group represented by Formulae 3a to 3j,
M2 and M3 are each independently a naphthalene group represented by Formulae 3g to 3j,

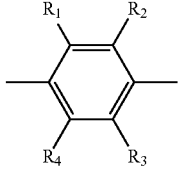

Formula 3a

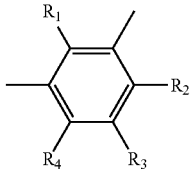

Formula 3b

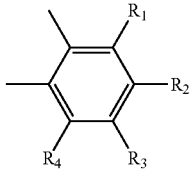

Formula 3c

-continued

Formula 3d
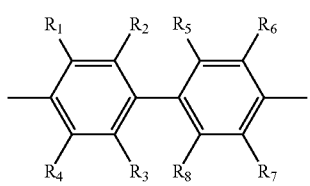

Formula 3e
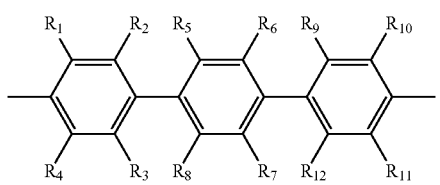

Formula 3f
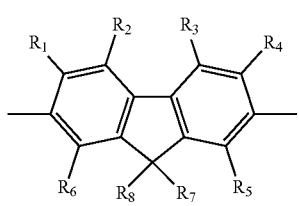

Formula 3g
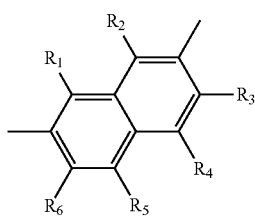

Formula 3h
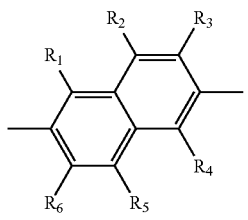

Formula 3i
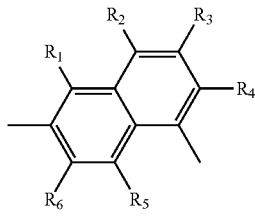

Formula 3j
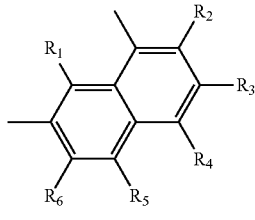

wherein, in Formulae 3a to 3j, $R_1$, $R_2$, $R_3$, $R_4$, $R_5$, $R_6$, $R_7$, $R_8$, $R_9$, $R_{10}$, $R_{11}$, and $R_{12}$ are each independently a hydrogen, a halogen, a hydroxy group, or a substituted or unsubstituted C1-C10 alkyl group;

A1 is a substituted or unsubstituted C4-C12 alkylene group, a substituted or unsubstituted C4-C12 alkenylene group, a substituted or unsubstituted C4-C12 alkynylene group, a substituted or unsubstituted C4-C12 alkadienylene group, or a (poly)oxyalkylene group comprising a substituted or unsubstituted C1-C5 alkylene group;

L1, L2, L3, and L4 are each independently —C(=O)O— or —OC(=O)—, and

E1 and E2 are each independently an epoxy-containing group.

2. The epoxy compound of claim 1, wherein A1 is an ethylene group, a propylene group, a butylene group, a pentylene group, a hexylene group, a heptylene group, an octylene group, a nonylene group, a decylene group, an undecylene group, a dodecylene group, a butadienylene group, a pentadienylene group, a hexadienylene group, a heptadienylene group, an octadienylene group, a nonadienylene group, a decadienylene group, an undecadienylene group, a dodecadienylene group, or —(CH$_2$O)p-, where p is a real number of 1 to 10.

3. The epoxy compound of claim 1, wherein E1 and E2 are each independently an epoxy-containing group represented by Formulae 6a to 6f:

Formula 6a
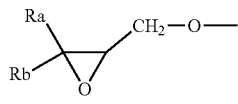

Formula 6b
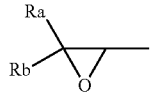

Formula 6c
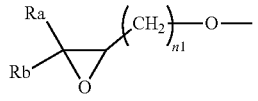

Formula 6d
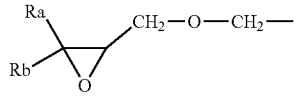

Formula 6e
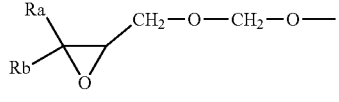

Formula 6f
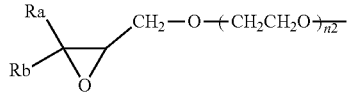

wherein, in Formulae 6a to 6f, $R_a$ and $R_b$ are each independently a hydrogen, a halogen, a hydroxy group, or a substituted or unsubstituted C1-C10 alkyl group, n1 is 2 to 10, and n2 is 1 to 10.

4. The epoxy compound of claim 1, wherein

M1 and M4 are each independently an arylene group represented by Formula 7a to 7j, M2 and M3 are each independently a naphthalene group represented by Formula 7g to 7j, and E1 and E2 are each independently an epoxy-containing group represented by Formulae 8a to 8f:

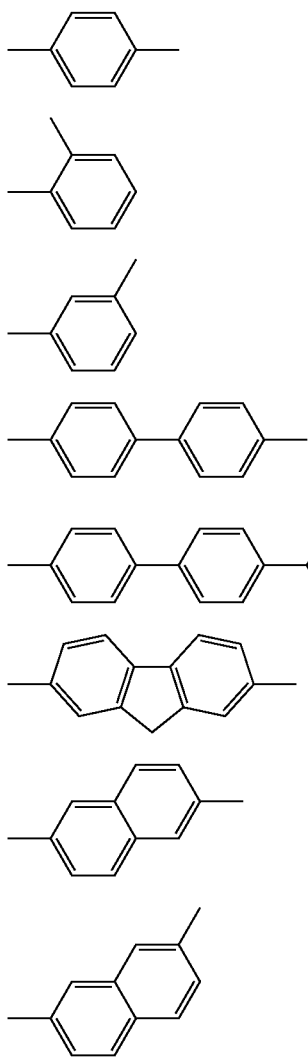
Formula 7a
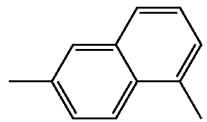
Formula 7b
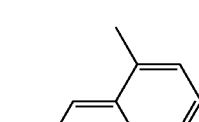
Formula 7c
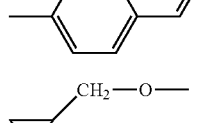
Formula 7d
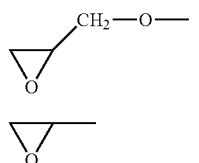
Formula 7e
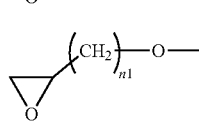
Formula 7f
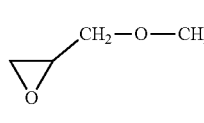
Formula 7g
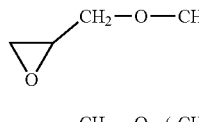
Formula 7h
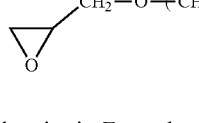
Formula 7i
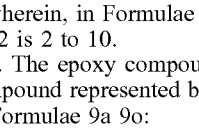
Formula 7j
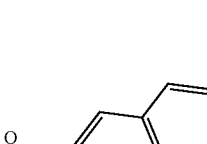
Formula 8a
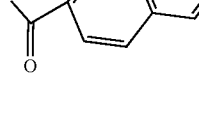
Formula 8b
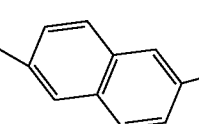
Formula 8c
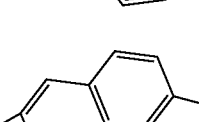
Formula 8d
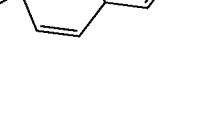
Formula 8e
Formula 8f
wherein, in Formulae 8a to 8f, n1 is 1 to 10, and n2 is 2 to 10.
5. The epoxy compound of claim 1, wherein the epoxy compound represented by Formula 1 is represented by one of Formulae 9a 9o:
Formula 9a
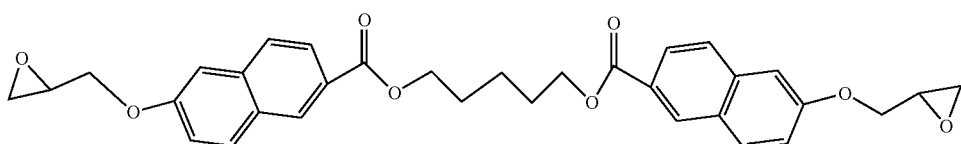
Formula 9b
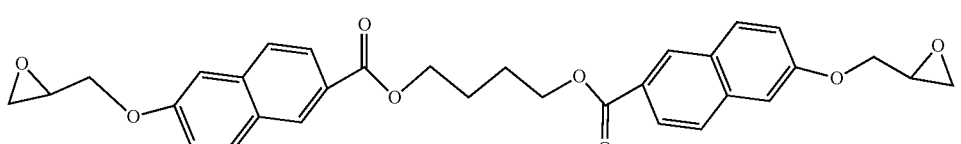
Formula 9c Formula 9e
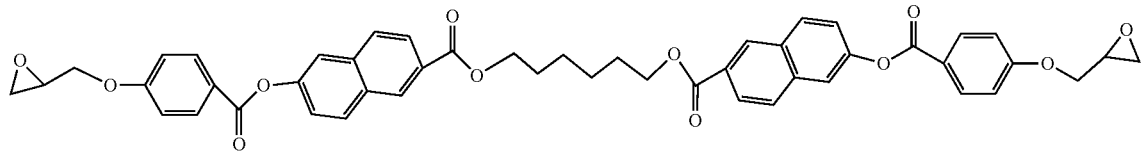
Formula 9f
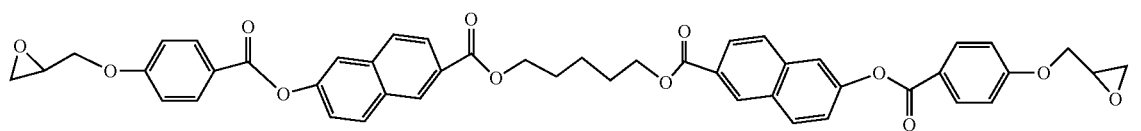
Formula 9g
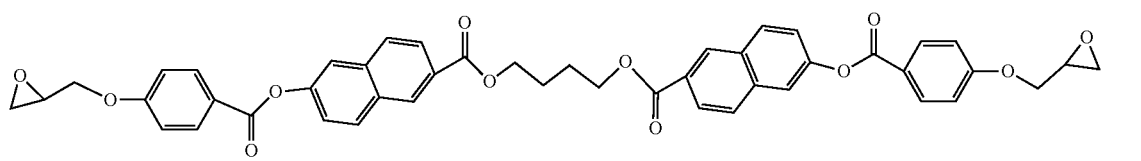
Formula 9i
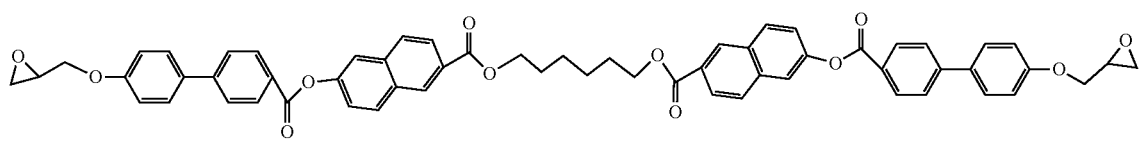
Formula 9j
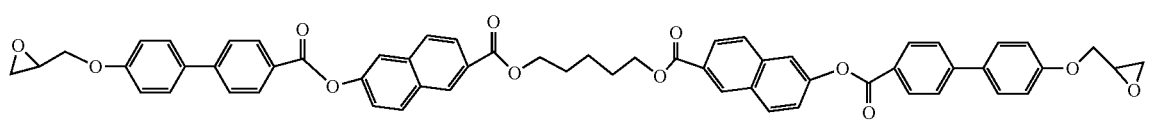
Formula 9k
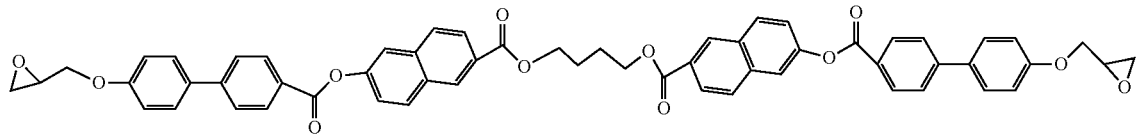
Formula 9m
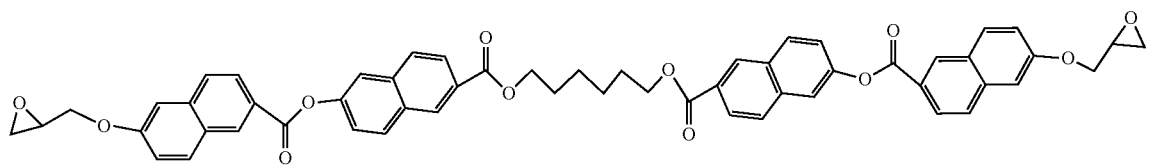
Formula 9n
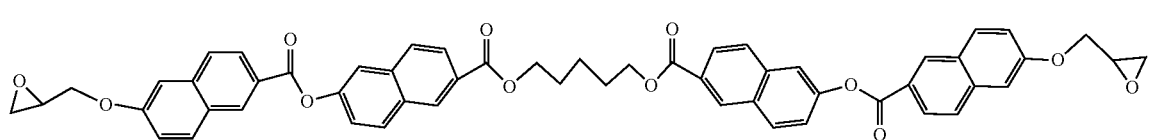
Formula 9o
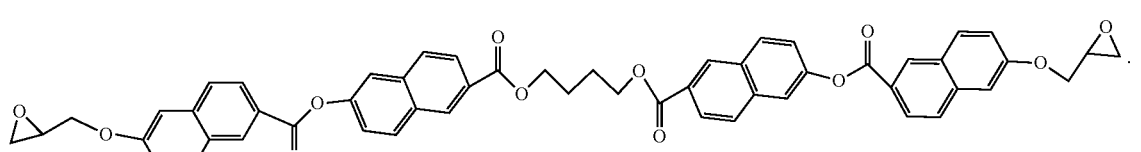

6. The epoxy compound of claim 1, wherein a melting point of the epoxy compounds represented by one of Formulae 4a to 4f is about 200° C. or lower.

7. An epoxy resin composition comprising:
   the epoxy compound of claim 1; and
   a curing agent.

8. The epoxy resin composition of claim 7, wherein a metal ion content of the resin composition is about 10 parts per million or less.

9. The epoxy resin composition of claim 7 further comprising a filler, wherein the filler is an inorganic filler, an organic filler, or a combination thereof.

10. The epoxy resin composition of claim 9, wherein an amount of the filler is in a range of about 20 weight % to about 99 weight % based on the total weight of the epoxy resin composition.

11. A semiconductor device comprising
    a substrate;
    a semiconductor; and
       a cured product of the epoxy resin composition of claim 7,
          wherein the cured product is a sealing portion, a substrate portion, a reinforcement portion, or an adhesive portion, of the semiconductor device.

12. The semiconductor device of claim 11, wherein a thermal conductivity of the cured product is about 0.25 Watts per meter-Kelvin or more.

13. An electronic device comprising:
    a substrate;
    an electronic component; and
       a cured product of the epoxy resin composition of claim 7,
          wherein the cured product is a sealing portion, a substrate portion, a reinforcement portion, or an adhesive portion, of the semiconductor device.

14. The electronic device of claim 13, wherein a thermal conductivity of the cured product is about 0.25 Watts per meter-Kelvin or more.

15. An article comprising
    a substrate; and
       a cured product of the epoxy resin composition of claim 7,
          wherein the cured product is a sealing portion, a substrate portion, a reinforcement portion, or an adhesive portion, of the article.

16. The article of claim 15, wherein a thermal conductivity of the cured product is about 0.25 Watts per meter-Kelvin or more.

* * * * *